(12) United States Patent
Lucas et al.

(10) Patent No.: US 7,311,960 B2
(45) Date of Patent: Dec. 25, 2007

(54) PRODUCTS AND METHOD OF CORE CRUSH PREVENTION

(75) Inventors: Scott D. Lucas, Scottsdale, AZ (US); Robin K. Maskell, Phoenix, AZ (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/317,409

(22) Filed: May 24, 1999

(65) Prior Publication Data
US 2003/0190452 A1 Oct. 9, 2003

Related U.S. Application Data

(63) Continuation-in-part of application No. 09/084,031, filed on May 22, 1998, now abandoned.

(51) Int. Cl.
*B32B 3/12* (2006.01)
*B32B 27/04* (2006.01)
*B32B 27/16* (2006.01)

(52) U.S. Cl. ........................ 428/116; 428/73; 442/101; 442/103

(58) Field of Classification Search ................ 442/101, 442/103; 428/72, 73, 116
See application file for complete search history.

(56) References Cited

U.S. PATENT DOCUMENTS

| | | | |
|---|---|---|---|
| 3,931,445 A * | 1/1976 | Schurb | |
| 4,179,537 A | 12/1979 | Rykowski | 427/387 |
| 4,213,930 A * | 7/1980 | Goodrich et al. | 264/135 |
| 4,283,450 A | 8/1981 | Luck et al. | 428/171 |
| 4,364,993 A * | 12/1982 | Edelman et al. | |
| 4,443,507 A * | 4/1984 | Yamada et al. | |
| 4,481,056 A | 11/1984 | Kuhl | 156/180 |
| 4,539,253 A * | 9/1985 | Hirschbueler et al. | |
| 4,695,501 A * | 9/1987 | Robinson | |
| 4,857,405 A * | 8/1989 | Cordova et al. | |
| 5,395,402 A | 3/1995 | Duckett | 8/115.6 |
| 5,397,632 A | 3/1995 | Murphy, Jr. et al. | 428/284 |
| 5,401,779 A | 3/1995 | Edelman et al. | 252/299 |
| 5,523,039 A | 6/1996 | Martin | 264/136 |
| 5,612,126 A | 3/1997 | Cross et al. | 442/227 |
| 5,895,699 A * | 4/1999 | Corbett et al. | 428/116 |
| 6,027,794 A * | 2/2000 | Ozaki et al. | 428/297.7 |
| 6,180,206 B1* | 1/2001 | Kain, Jr. | 428/116 |

(Continued)

FOREIGN PATENT DOCUMENTS

EP 0 330 338 8/1989

(Continued)

OTHER PUBLICATIONS (Corrected) PCT International Search Report PCT/US99/11227 (Mailed Feb. 11, 2000).

(Continued)

*Primary Examiner*—Jenna-Leigh Befumo
(74) *Attorney, Agent, or Firm*—Robert R. Neller

(57) ABSTRACT

Stiffness-treated honeycomb sandwich structures which exhibit reduced core crush and/or reduced void content are provided. Additionally, stiffness-treated prepreg plies which exhibit increased frictional resistance when disposed on other prepreg plies are also provided. Further, associated starting materials and methods are provided.

5 Claims, 10 Drawing Sheets

U.S. PATENT DOCUMENTS 6,429,157 B1 * 8/2002 Kishi et al. ................. 442/227

FOREIGN PATENT DOCUMENTS

| EP | 0 648 888 | 4/1995 |
| EP | 0 726 348 | 8/1996 |
| GB | 2 325 674 | 12/1998 |
| JP | 49-040877 | 11/1974 |
| JP | 06-279068 | 10/1994 |
| JP | 08-027680 | 1/1996 |
| SE | 9 400 746 | 9/1995 |
| WO | 95/13418 | 5/1995 |
| WO | 97/25198 | 7/1997 |
| WO | 97/30097 | 8/1997 |

OTHER PUBLICATIONS

PCT International Written Opinion PCT/US99/11227 (Mailed Feb. 10, 2000).

PCT International Search Report PCT/US/99/11227 (Mailed Jan. 12, 2000).

Official Action dated May 30, 2001 from Taiwan Patent Office and English translation.

* cited by examiner

TYPICAL SILANE COUPLING AGENT

A-SI-R-B

A - HYDROLYZABLE FUNCTION

Si - SILICON ATOM

R - ALKYL BRIDGING GROUP

B - ORGANOFUNCTIONAL GROUP

COUPLING AGENT CHEMISTRY

R'= REACTIVE ORGANIC GROUP
SUBSTRATE= GLASS FABRIC

TYPICAL SILANE COUPLING AGENT

PRODUCTS AND METHOD OF CORE CRUSH PREVENTION

The following application is a continuation-in-part of U.S. application, Ser. No. 09/084,031, filed on May 22, 1998, now abandoned.

BACKGROUND OF INVENTION

The invention relates generally to the field of laminated structures, and more particularly to methods for making honeycomb sandwich structures and associated products with decreased core crush values and/or reduced void content. In addition, the invention relates to the starting materials utilized to assemble such honeycomb sandwich structures.

Co-cured honeycomb sandwich structures comprising a honeycomb core and at least one prepreg ply (i.e., a fabric impregnated with a resin system) disposed on each surface of the honeycomb core are used throughout the aerospace industry in order to provide high mechanical strength at low densities.

A major problem of honeycomb sandwich structures is the tendency of the honeycomb core to crush during the autoclave process in manufacture. This problem is commonly referred to as "core crush." Core crush during the production of structures (e.g., airplane structures) renders the structure useless and increases production costs due to direct labor, delays and material expenses.

Core crush is known to occur due to differential movement during the autoclave process between the prepreg plies that comprise the honeycomb sandwich structure. This differential movement was believed by the industry to possibly occur late in the autoclave cycle when the resin system's viscosity is at a minimum. Thus, known methods utilized to reduce core crush during the autoclave process have focused on preventing the differential movement by either mechanical/physical means (i.e., using tie downs to keep the prepreg plies from differentially moving) or by chemical means focusing on the resin system (i.e., using a fast reacting resin system to permit increase of the viscosity of the resin system), or on other parameters of the autoclave process (e.g., resin system utilized, such as vacuum levels used for staging and lay-up or in-situ and post processing internal pressure). See, generally, D. J. Renn, T. Tulleau, J. C. Seferis, R. N. Curran and K. J. Ahn, "Composite Honeycomb Core Crush in Relation to Internal Pressure Measurement," Journal of Advanced Materials, October 1995, pp.31-40 ("The resin system was shown to be the most important parameter in determining core crush"). However, known mechanical/physical means of reducing core crush may increase production costs due to increased labor costs. Moreover, known chemical means of reducing core crush focusing on the resin system or other parameters of the autoclave process have sometimes failed to provide satisfactory reduction of core crush in known honeycomb sandwich structures.

An additional problem associated with honeycomb sandwich structures made by conventional methods is their tendency, in some cases, to break down over time due to the presence of a high content of voids and/or delaminations within and between the prepreg plies of the honeycomb sandwich structure. This problem is commonly referred to as "high void content." High void content in the prepreg plies may facilitate ingression and accumulation of moisture in the voids of the prepreg plies. When subjected to elevated temperatures (e.g., autoclave conditions), this moisture increases the pressure within the voids in the prepreg plies and expands the size of the existing voids in the resulting cured structure. Further, high void content in the cured structure provides a pathway for moisture to ingress and accumulate in the core of the structure, thereby adding weight to the structure. High void content thus tends to shorten the life of the structure and/or increase undesired properties (e.g. weight) of the structure, and increases production costs due to direct labor, delays and material expenses.

A known cause of high void content is insufficient consolidation of the components of the honeycomb sandwich structure during the autoclave process. Consolidation is known to optimally occur at high pressure (i.e., about 100 PSI) during the high temperature autoclave cycle. Consolidation of the components of a known honeycomb sandwich structure generally occur at relatively low pressures (i.e., less than about 45 PSI) because the higher pressures (i.e., greater than about 45 PSI and up to about 85 PSI) that would enhance consolidation would inadvertently cause core crush in known honeycomb sandwich structures. Thus, known methods utilized to reduce void content have generally focused on resin modifications and prepreg processing techniques to reduce moisture content and entrapped air within the prepreg. These known methods may increase production costs of honeycomb sandwich structures due to the need to process each honeycomb sandwich structure through at least two autoclave cycles. Additionally, low consolidating pressure used in these known methods may fail to sufficiently advance the consolidation of the prepregs plies with the honeycomb core.

As discussed above, known prepreg plies may have their differential movement constrained to reduce core crush in honeycomb sandwich structures produced therefrom. Known methods of constraining this differential movement have focused on mechanical/physical constraining means (i.e., using tie downs) or chemical constraining means focusing on certain parameters of the autoclave process (e.g., resin system utilized, vacuum levels used for staging and lay-up, in-situ and post processing internal pressure), as discussed above. However, as discussed above, these mechanical and chemical constraining means may increase production costs due to increased labor costs and/or may fail to at all times provide satisfactory reduction of core crush in known honeycomb sandwich structures.

Known fabric components of prepreg plies generally consist of fibers which have been sized and/or finished. Sizing of the fabric facilitates weaving of the fibers into a fabric. Finishing of the fabric enhances certain known properties of the fabric (e.g., moisture resistance) and certain mechanical properties of the prepreg ply formed from the finished fabric (e.g., tensile strength, compression strength, and adhesive characteristics to honeycomb core in honeycomb sandwich structure).

Properties generally associated with known fabric components of the prepreg ply are as follows.

Commercially available carbon-fiber based fabrics are generally sized but unfinished, with sizing concentrations of 0.5% to 1.5%+/−0.1% (by weight) depending on the type of weave employed and/or the type of end use contemplated and/or the type of sizing utilized. By contrast, commercially available glass-fiber based fabrics are sized and then finished. However, the starch-based sizing is substantially removed by baking after weaving of the fabric and before application of the finish. These glass-fiber based fabrics may have finish concentrations of 0.08% to 0.21%+/−0.018% (by weight) depending on the type of weave employed and/or the type of end use contemplated and/or the type of finish utilized. For example, commercially available glass-fiber based fabrics made utilizing an 8-harness satin weave and proprietary finishes commercially available from Clark-Schwebel™ (Anderson, S.C.) (i.e., CS 724) or Burlington Glass Fabrics™ (Alta Vista, Va.) (i.e., BGF 644, BGF 508, BGF 508A) are believed to have a finish concentration of 0.10%+/−0.02%.

Known glass-fiber based fabric components (with finish) based on a fabric having an 8-harness satin weave and a fiber areal weight of 293+/−10 g/m² generally have an ASTM stiffness value of less than 3.0 pound foot (lb ft). An exception to this general rule is a glass-fiber based fabric finished with F-69 (Hexcel™ Corporation, Casa Grande, Ariz.), which Applicants have measured to have an ASTM stiffness value of about 9.25 lb ft, based on tests performed on a sample of an 8-harness weave glass-fiber based F-69 finished fabric having a fiber areal weight of 293+/−10 g/m². Known carbon-fiber based fabric components (with sizing) based on a fabric having a plain weave and a fiber areal weight of 193+/−7 g/m² generally have an ASTM stiffness value of not greater than 3.3 pound foot (lb ft).

Processing associated with known fabric components of the prepreg ply is generally as follows. Known glass-fiber based fabric components are generally finished by application of the finish, followed by heat treatment at a temperature in the range of 300° F. to 350° F.

Accordingly, there is a need for new and better honeycomb sandwich structures exhibiting reduced core crush. Additionally, there is a need for new and better honeycomb sandwich structures exhibiting reduced void content. Further, there is a need for new and better prepreg plies having constrained differential movement (e.g., during manufacture). In addition, there is a need for new and better starting materials for the honeycomb sandwich structures exhibiting reduced core crush, the honeycomb sandwich structures exhibiting reduced void content, and the prepreg plies whose differential movement is constrained.

SUMMARY OF INVENTION

In accordance with the invention, it has been discovered that the ASTM stiffness value of the fabric component of prepreg plies and honeycomb sandwich structures can influence the differential movement of prepreg plies, the core crush value and the void content of honeycomb sandwich structures. Certain ways of altering the ASTM stiffness value of this fabric component have been developed.

Accordingly, under one aspect of the invention, there have been developed stiffness-treated fabrics comprising a plurality of fibers and polymeric material disposed on at least some of the fibers, wherein the stiffness-treated fabric exhibits an ASTM stiffness value greater than the ASTM stiffness value of an untreated fabric. The magnitude of this increase in ASTM stiffness value for stiffness-treated fabrics can be defined in percentage terms (e.g., not less than 7%) or in absolute terms (e.g., not less than 3.4 lb ft).

In a further aspect of the invention, there have also been developed methods of making stiffness-treated fabrics having an ASTM stiffness value greater than the ASTM stiffness value of an untreated fabric, which methods comprise obtaining a fabric comprising a plurality of fibers and polymeric material and/or precursors of polymeric material disposed on at least some of the fibers, and treating the fabric under conditions sufficient to produce an ASTM stiffness value of the stiffness-treated fabric greater than the ASTM stiffness value of an untreated fabric. These conditions include without limitation heat treatment, ultraviolet treatment, free radical mechanisms and other methods of treating precursors to advance polymeric material formation and/or chemical binding of precursors and/or polymeric materials to the fibers. Heat treatment may occur at stiffness-enhancing treatment temperatures, and/or for a stiffness-enhancing resident time, and/or for a stiffness-enhancing time-temperature product, and/or in the presence of precursors at a stiffness-enhancing precursor concentration, and/or in the presence of a stiffness-enhancing heated gas circulation rate. Alternatively, heat treatment may occur at lower temperatures, so long as substantially all of the heat energy generated at the lower temperatures is transferred to the materials to be stiffness-treated.

In an additional aspect of the invention, there have also been developed stiffness-treated fabrics having an ASTM stiffness value greater than the ASTM stiffness value of an untreated fabric made by the foregoing methods.

In another aspect of the invention, there have also been developed stiffness-treated fabric raw materials comprising fabric raw material, precursors of polymeric material disposed on at least some of the fabric raw material in a stiffness enhancing precursor concentration, and, optionally, polymeric materials disposed on at least some of the fabric raw material. The stiffness enhancing precursor concentration may be measured in terms of an increase in weight percentage or in concentration (weight/weight) percentage over precursor concentrations which do not yield increased ASTM stiffness values for known treatment conditions.

In another aspect of the invention, there have been developed methods of making stiffness-treated fabric raw materials comprising obtaining fabric raw material, and disposing on at least some of the fabric raw material 1) precursors of polymeric material in a stiffness enhancing precursor concentration, and, 2) optionally, a polymeric material. Additionally, there have been developed methods of making stiffness-treated fabric raw materials comprising obtaining fabric raw material which comprises precursors of polymeric material and/or precursors of polymeric material disposed on at least some of the fabric raw material, and treating the fabric raw material under conditions selected to render an ASTM stiffness value of a stiffness-treated fabric made from the stiffness-treated fabric raw material greater than the ASTM stiffness value of an untreated fabric. For example, the treatment can be selected from the group consisting of heat treatment, ultraviolet treatment, and free radical mechanisms.

In a further aspect of the invention, it has been discovered that the increased ASTM stiffness value of the invention stiffness-treated fabrics made by the treatment process described herein results from one or more of the following optionally present properties of the invention fabrics and/or the invention fabric raw materials. First, during treatment a portion of the polymeric material in the fabric or fabric raw materials may be chemically bonded to the fibers and/or the fabric raw materials and advanced n-mers of precursors of the polymeric material may develop during treatment. Second, a portion of the polymeric material may chemically bond to the fibers and/or the fabric raw materials and may coat the fibers and/or the fabric raw materials so as to increase the average thickness thereof when compared to the corresponding fibers and/or fabric raw materials of an untreated fabric. Third, during treatment certain components of the fibers (e.g., yarns or tows, and filaments) may have the polymeric material disposed on their capillary surface at an average thickness greater than the average thickness of the polymeric material disposed non-capillary surface of the same components.

In an additional aspect of the invention, there have been developed stiffness-treated prepreg plies comprising a stiffness-treated fabric and a resin system.

In another aspect of the invention, there have been developed methods of making stiffness-treated prepreg plies by obtaining a stiffness-treated fabric and a resin system, and disposing the resin system on the stiffness-treated fabric.

In an additional aspect of the invention, it has been discovered that the use of stiffness-treated fabric in the construction of stiffness-treated prepreg plies allows for greater frictional resistance between a stiffness-treated prepreg ply and any other ply (stiffness-treated or untreated) than the frictional resistance between two untreated prepreg plies. The magnitude of this frictional resistance between a stiffness-treated prepreg ply and any other ply (stiffness-treated or untreated) may be defined as an absolute value (e.g., 30 to 200 pounds) or as a percentage increase over the frictional resistance between two untreated prepreg plies (e.g., 10% to 600%).

In a further aspect of the invention, there have been developed stiffness-treated honeycomb sandwich structure precursors comprising a honeycomb core having a first surface, and a stiffness-treated prepreg ply disposed on the first surface, wherein the stiffness-treated prepreg ply comprises a resin system and an invention stiffness-treated fabric. Optionally, these stiffness-treated honeycomb sandwich structure precursors may further comprise at least one additional prepreg ply disposed on the first surface, wherein each of the additional prepreg ply(ies) can comprise an independently selected resin system and an independently selected stiffness-treated fabric or non-treated fabric. At least one of the additional prepreg plies and the stiffness-treated prepreg ply may optionally extend beyond the first surface of the honeycomb core for lamination during future treatment to convert the precursor to a honeycomb sandwich product.

In another aspect of the invention, there have been developed stiffness-treated honeycomb sandwich structures comprising a honeycomb core having a first surface and a second surface, a first prepreg ply disposed on and extending beyond the first surface, and a second prepreg ply disposed on and extending beyond the second surface, wherein a portion of the first prepreg ply extending beyond the first surface contacts a portion of the second prepreg ply extending beyond the second surface to form an edgeband. Optionally, additional prepreg plies can be disposed on the first surface and/or the second surface and/or the edgeband. The first prepreg ply comprises a resin system and an invention stiffness-treated fabric, and the second prepreg ply and each of the optional additional prepreg plies each comprises an independently selected resin system and a fabric independently selected from the invention stiffness-treated fabrics or untreated fabrics. Optionally, the first prepreg ply has an elevated resin content.

In an additional aspect of the invention, there have been developed methods of making stiffness-treated honeycomb sandwich structure precursors comprising obtaining an assembled honeycomb sandwich precursor comprising a honeycomb core having a first surface, and a first prepreg ply disposed on the first surface, wherein the first prepreg ply comprises a resin system and a fabric selected from the invention stiffness-treated fabrics, and treating the assembled honeycomb sandwich precursor under autoclave conditions sufficient to consolidate the assembled honeycomb sandwich precursor.

In a further aspect of the invention, there have been developed methods of making a stiffness-treated honeycomb sandwich structure comprising obtaining an assembled honeycomb sandwich comprising a honeycomb core having a first surface and a second surface, a first prepreg ply disposed on and extending beyond the first surface, a second prepreg ply disposed on and extending beyond the second surface, wherein a first portion of the first prepreg ply extending beyond the first surface contacts a second portion of the second prepreg ply extending beyond the second surface to form an edgeband. Optionally, additional prepreg plies can be disposed on the first surface and/or the second surface and/or the edgeband. The first prepreg ply comprises a resin system and a fabric selected from the invention stiffness-treated fabrics, and the second prepreg ply and each of the optional additional prepreg plies each comprises an independently selected resin system and an independently selected stiffness-treated fabric or untreated fabric. The assembled honeycomb sandwich is treated under autoclave conditions sufficient to consolidate the assembled honeycomb sandwich.

The use of at least one stiffness-treated prepreg ply in the construction of a stiffness-treated honeycomb sandwich structure enhances certain desirable properties of the stiffness-treated honeycomb sandwich structure. For example, the core crush value of a stiffness-treated honeycomb sandwich structure is less than a second core crush value of an untreated honeycomb sandwich structure wherein each prepreg ply thereof is an untreated prepreg ply. The core crush value of a stiffness-treated honeycomb sandwich structure may be defined as the percentage of the area of the honeycomb sandwich structure which exhibits core crush (e.g., 0% to 5%) depending upon the treatment conditions selected. For example, the autoclave conditions used to treat an assembled honeycomb sandwich can be selected to yield a core crush value of not greater than 3% in the stiffness-treated oneycomb sandwich structure by utilizing therein a pressure (in the range from about 45 PSI to 85 PSI). Pressure in this range is higher than the pressure under which an untreated honeycomb core is believed to be consolidated without resulting in a core crush value of greater than 3% (i.e., less than 45 PSI). Due to this increased pressure during consolidation under autoclave conditions, the void content of the stiffness-treated honeycomb sandwich structure is less than that of an untreated honeycomb sandwich structure.

The invention has the following advantages. The invention provides honeycomb sandwich structures that are stiffness-treated to exhibit reduced core crush and/or reduced void content, thus enhancing the strength, operating weight and/or life of the structures. Further, the invention prepreg plies, which are stiffness-treated to increase their frictional resistance, have constrained differential movement against other prepreg plies, a feature that reduces waste caused by slippage during manufacture. The invention fabrics are stiffness-treated starting materials for manufacture of honeycomb sandwich structures exhibiting reduced core crush and reduced void content, and for manufacture of prepreg plies with increased frictional resistance against other prepreg plies.

BRIEF DESCRIPTION OF DRAWINGS

FIG. 2A is a cross-sectional view illustrating a general lay-up of a pre-laminate structure, and FIG. 2B is a top view of the structure.

DETAILED DESCRIPTION OF THE PREFERRED EMBODIMENTS

In accordance with the invention, there are provided stiffness-treated fabrics comprising a plurality of fibers, polymeric material disposed on at least some of the fibers, and, optionally, precursors of the polymeric material disposed on at least some of the fibers, wherein the stiffness-treated fabrics exhibit an ASTM stiffness value greater than the ASTM stiffness value of an untreated fabric.

Fibers utilized in accordance with the invention include glass fibers, carbon fibers, aramid fibers, Kevlar™ fibers, and quartz fibers, each of which fibers may be of variable length and variable width. The fibers utilized in accordance with the invention may each comprise a bundle of filaments of variable length and variable width. Thus, glass fibers may comprise yarns, each of which yarns comprises a bundle of filaments of variable length and variable width. Additionally, carbon fibers may comprise tows, each of which tows comprises a bundle of filaments of variable length and variable width. Further, aramid fibers, Kevlar™ fibers, and quartz fibers may each comprise substituent components (including yarns and/or tows and/or filaments and/or other substituents) of variable length and variable width.

The polymeric material useful in the practice of the invention includes derivatives of the precursors of a polymeric material. These derivatives are of the general chemical formula (precursor)$_n$ minus the particular leaving groups required for the formation of the applicable derivative of the precursor, wherein n>2. These derivatives include any of the following species: oligomers, glycidyl ethers, glycidyl amines, ethoxylated species, cross-linked species {e.g., addition products (including without limitation etherification) and condensation products}, chain-extended species {e.g., addition products (including without limitation etherification) and condensation products}, hydrogen-bonded species, ionic-bonded species, free radical reaction species, and, for glass fibers, oxanes and siloxanes, and, for carbon fibers, species made by basic curing mechanisms (e.g., Lewis base reaction products, inorganic base reaction products, primary and/or secondary amine reaction products, and/or amide reaction products), acid curing mechanisms (e.g., Lewis acid reaction products, phenol reaction products, organic acid reaction products, and/or anhydride reaction products), and olefin reaction products. Optionally, these derivatives may be thermoplastic and/or elastomeric materials.

Figure 7:
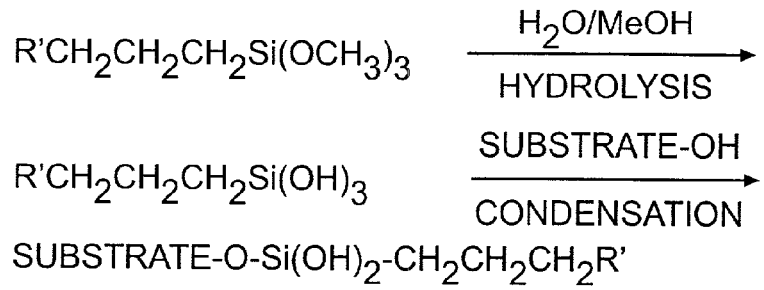
FIG. 7 illustrates the chemistry underlying formation of chemical bonds between silane coupling agent precursors and fiber surface via hydrolysis and condensation.
Figure 8:
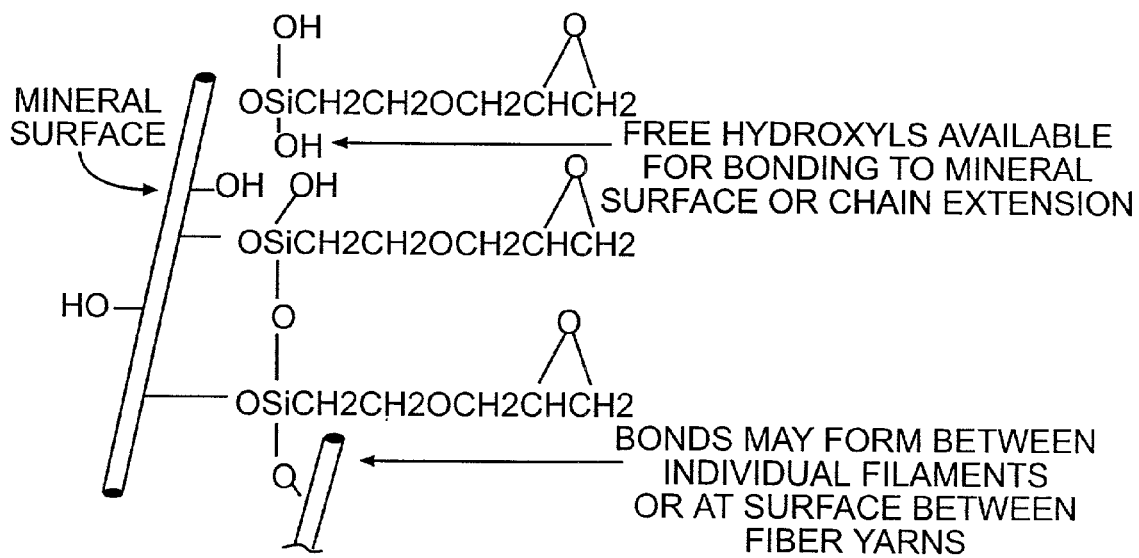
FIG. 8 schematically illustrates the chemistry underlying silane coupling agent precursors forming chemical bonds with fiber surface and/or other silane coupling agents (i.e., to form polymeric material) via condensation.
Figure 9:
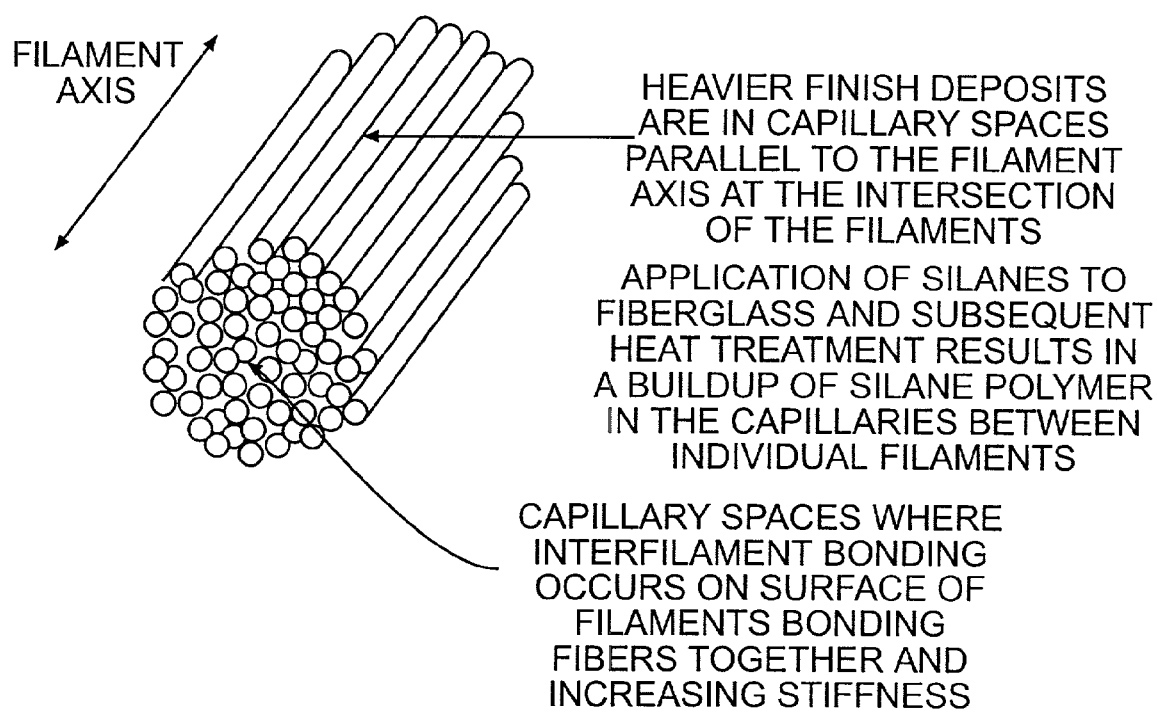
FIG. 9 schematically illustrates the accumulation of precursors and/or polymeric coupling agent in the capillary spaces between the filaments, which accumulation is caused by heat treatment.

Conditions sufficient to permit formation of these derivatives of the precursors of the polymeric material are those that advance polymerization of the precursors of the polymeric material with each other, and include temperature, pressure and other reaction conditions (e.g., pH, presence of amines in varying concentrations, presence of electron withdrawing groups, presence of high energy photons, etc.,) that promote oligomer formation, glycidyl ether formation, glycidyl amine formation, ethoxylated species formation, cross-linked species formation, addition reactions (including without limitation etherification), condensation reactions, chain-extended species formation, hydrogen-bonded species formation, ionic species formation, and free radical reaction species formation. For glass fibers, such conditions include those that promote oxane formation and/or siloxane formation. See, for example, FIGS. 7 and 8. For carbon fibers, such conditions include those that promote basic curing mechanisms (e.g., Lewis base reaction products, inorganic base reaction products, primary and/or secondary amine reaction products, and/or amide reaction products), acid curing mechanisms (e.g., Lewis acid reaction products, phenol reaction products, organic acid reaction products, and/or anhydride reaction products) and/or olefin reaction mechanisms.

These derivatives may have further optional properties. For example, most of the known derivatives associated with the "sizing" of carbon fibers may optionally have an epoxy equivalent weight (EEW) of greater than m, where m is selected from any value in the range of between about 260 gram equivalents to about 5500 gram equivalents, where "epoxy equivalent weight" means the weight (in grams) of the polymeric material which contains 1 gram equivalent of epoxy functionality.

It is contemplated within the scope of the invention that these derivatives may be polymerized from the precursors at any time until the time a structure which incorporates the stiffness-enhanced fabric has been formed and consolidated, including before or after the disposition on at least some of the fibers of the precursors, before or after wetting the precursor-coated fibers with resin, and before or at the time of consolidation of the precursor-coated resin-impregnated fibers under autoclave conditions. Preferably, the derivatives are polymerized from the precursors prior to wetting the fabric on which the precursors may be disposed with an appropriate resin.

The precursors of a polymeric material useful in the practice of the invention include chemical agents associated with a particular fiber, which chemical agents are utilized by those of skill in the art to facilitate weaving of the fibers into a fabric, and/or to enhance processibility and/or mechanical properties of the fibers, and/or to prevent moisture adsorption of the fibers. Derivative formation (e.g., polymerization) based on this chemical agent may occur by any means known to the those of skill in the art, including without limitation heat and/or ultraviolet light and/or free radical catalyzation means. Although some polymerization and/or derivative formation of the chemical agent may have occurred, the polymerization of chemical agents is generally not taken to completion. In addition, the chemical agent, in unpolymerized form, may have reactive side and/or end groups which permit the chemical agent (i) to polymerize and/or form derivatives with itself, and/or (ii) to chemically bond to its associated fibers.

Thus, the precursors of a polymeric material associated with glass fibers are generally known as "finishes." Finishes associated with glass fibers may have the general chemical structure of:

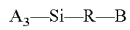

wherein
each A is independently selected from hydrogen, —(CH$_2$)$_n$ (where n may vary from 1 to 4), or a hydrolyzable function which may comprise any of following chemical species:
—OH, —OCH$_3$, —OCH$_2$CH$_3$, —OCH$_2$CH$_2$OCH$_3$, —CH$_3$, —OCH$_3$, —OCH$_2$CH$_2$OH, and —O(O)CCH$_3$,
Si is silicon,
R is an alkyl bridging group, and may be absent or may comprise any of the following chemical species:
—(CH$_2$)$_n$ (where n may vary from 1 to 7), —(NH(CH$_2$)$_n$)$_a$ (where a may vary from 1 to 3, and n may vary from 1 to 4), and S$_4$ (CH$_2$CH$_2$CH$_2$)$_2$, and
B is an organofunctional group, and may comprise any of the following chemical species:
—CH$_3$, CH$_2$=C(CH$_3$)C(O)O—, (CH$_2$=CH$_2$)-Ph-CH$_2$— [where Ph is a phenyl ring, and (CH$_2$=CH$_2$)-Ph-is styrene], CH$_2$—CHCH$_2$O—, CH$_2$=CH—, Cl(CH$_2$)$_n$— [where n may vary from 1 to 3], —SH, —NH$_2$, —NH$_2$(CH$_2$CH$_2$NH)$_n$ [where n may vary from 1 to 3], —N=C=O, —NH—(CH$_2$)$_n$—Si—A$_3$ [where n may vary from 1 to 3], —NH—C(O)—NH$_2$, —NH-Ph (where Ph is a phenyl ring), and

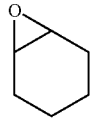

Figure 6:
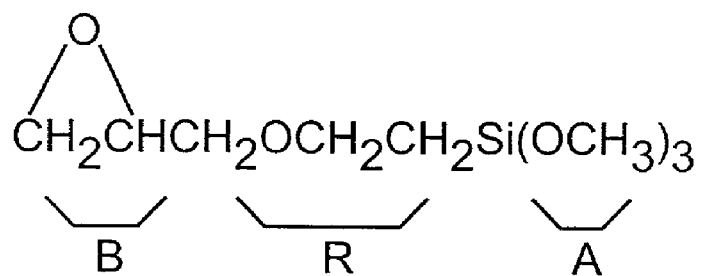
FIG. 6 schematically illustrates the structure of a typical species of finish for glass fibers, a silane coupling agent.

(See, for example, FIG. 6).

Alternatively, finishes associated with glass fibers may comprise the following species: N-(2-aminoethyl)-3-aminopropyltrimethoxysilane, 3-Methacryloxypropyltrimethoxysilane, N-(2-(Vinylbenzylamino)-ethyl)-3-aminopropyltrimethoxysilane, 3-Glycidoxypropyltrimethoxysilane, Vinyltriacetoxysilane, Octyltriethoxysilane, Methyltriethoxysilane, Methyltrimethoxysilane, tris-(3-(Trimethoxysilyl)propyl) isocyanurate, Vinyltriethoysilane, Vinyl trimethoxysilane, Vinyl-tris-(2-methoxyethoxy) silane, Vinylmethyldimethoxysilane, gamma-Methacryloxypropyltrimethoxysilane, beta-(3,4-Epoxycyclohexyl)ethyltrimethoxysilane, gamma-Glycidoxypropyltrimethoxysilane, gamma-Mercaptopropyltrimethoxysilane, bis-(3-[triethoxysilyl]-propyl)-tetrasulfane, gamma-Aminopropyltriethoxysilane, Aminoalkyl silicone solution [of general formula (H$_2$NCH$_2$CH$_2$CH$_2$SiO$_{1.5}$)$_n$— (where n may vary from 1 to 3)], gamma-Aminopropyltrimethoxysilane, N-beta-(Aminoethyl)-gamma-aminopropyltrimethoxysilane, triaminofunctional silane, bis-(gamma-trimethoxysilylpropyl)amine, N-Phenyl-gamma-aminopropyltrimethoxysilane, polyazamide silane (50% in methanol), N-beta-(aminoethyl)-gamma-aminopropylmethyldimethoxysilane, gamma-Ureidopropyltrialkoxysilane (50% in methanol), gamma-Ureidopropyltrimethoxysilane, and gamma-Isocyanatopropyltriethoxysilane. Optionally, finishes associated with glass fibers may comprise chloroalkyl species, generally, with 3-Chloropropyltrimethoxysilane as an example of such optional finishes. Additionally, finishes associated with glass fibers may comprise species commercially available from Dow Corning™ (Midland, Mich.) under the following designations: Z-6020, Z-6030, Z-6032, Z-6040, Z-6075, and, optionally, Z-6076. Additionally, finishes associated with glass fibers may comprise the following species commercially available from OSI Specialties (Danbury, Conn.) under the following designations: A-137, A-162, A-163, A-1230, Y-11597, RC-1, A-151, A-171, A-172, A-2171, A-174, A-186, A-187, A-189, RC-2, A-1289, A-1100, A-1101, A-1102, A-1106, A-1108, A-1110, A-1120, A-1126, A-1128, A-1130, A-1170, Y-9669, Y-11343, A-1387, A-2120, A-1160, Y-11542, and A-1310. Further commercially available finishes associated with glass fibers are described in the following publications, the entire contents of each of which are hereby incorporated herein by reference: "A Guide to Dow Corning Silane Coupling Agents," Form No. 23-012C-90 (Available from Dow Corning™ (Midland, Mich.)); "Coupling Agents for Textile Applications," Form No. 25-343-92 (Available from Dow Corning™ (Midland, Mich.)); OSI Specialties, "Organofunctional Silanes," Form No. SC-1294 (12-91-15M) (Available from OSI Specialties™ (Danbury, Conn.)); OSI Specialties, "Silquest™ Silanes—Products and Applications," Form No. 10-009-20, 6-0499, 10-96-5M (Available from OSI Specialities™ (Danbury, Conn.)).

Further, the precursors of a polymeric material associated with carbon fibers are known as "sizing." Sizing associated with carbon fibers is based on Bisphenol A, which has the general chemical structure of:

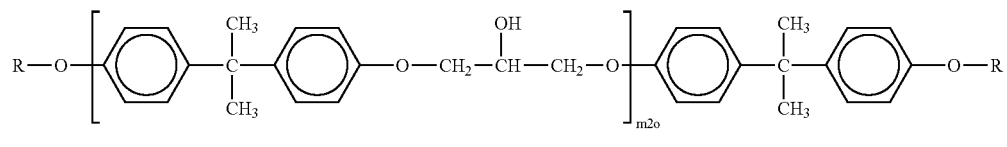

R = —H

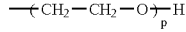

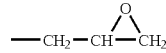

Optionally, the sizing may feature polyurethane components derived from toluene di(isocyanate) (TDI), which TDI has the general chemical structure of:

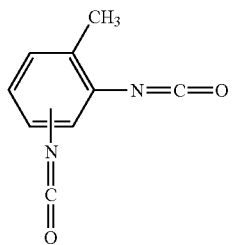

Further, the sizing may be partially polymerized and/or have derivatives (as defined above) thereof formed, and may optionally have an epoxy equivalent weight (EEW) of any value selected from the range of between about 260 gram equivalents to about 5500 gram equivalents, where "epoxy equivalent weight" means the weight (in grams) of the polymeric material which contains 1 gram equivalent of epoxy functionality.

Those of skill in the art will be able to identify, in light of the teachings of the invention, additional species of finishes, sizings, and precursors suitable for use with known glass fibers and carbon fibers in the practice of the invention, and these additional finishes are contemplated within the scope of the invention and are hereby incorporated herein by reference.

Those of skill in the art also will be able to identify, in light of the teachings of the invention, additional species of finishes, sizings, and precursors associated with aramid, Kevlar™, and quartz fibers which may be utilized in the practice of the invention, and these additional finishes are contemplated within the scope of the invention and are hereby incorporated herein by reference.

As used herein, "ASTM stiffness value" is the value of the stiffness of a fabric (in lbs) as determined by the circular bend procedure. The circular bend procedure was developed by the American Society for Testing and Materials (ASTM). This circular bend procedure is published in the Annual Book of ASTM Standards (1996), under the fixed designation D 4032 (first published or last revised 1994), and under the title "Standard Test Method of Stiffness of Fabric by the Circular Bend Procedure." All portions of the Annual Book of ASTM Standards relevant to this circular bend procedure are hereby incorporated herein by reference.

As utilized herein, "untreated fabric" means a fabric, which optionally has the same types of fiber, weave, and/or precursors of polymeric material as the fiber, weave, and/or precursors of polymeric material of the stiffness-treated fabric with which is it is compared. An untreated fabric is a fabric that can comprise fabric raw materials and, optionally, precursors of polymeric material, wherein both the fabric and the fabric raw materials have not been treated under conditions which advance polymerization and/or derivative formation of precursors of polymeric materials to the extent necessary to reduce core crush to less than 5%, or preferably less than 3%, or the presently preferred less than 0.1%. These conditions include without limitation (a) ultraviolet treatment, (b) free radical catalytic treatment, (c) heat treatment either (i) at stiffness-enhancing treatment temperatures, and/or (ii) for a stiffness-enhancing resident time, and/or (iii) for a stiffness-enhancing time-temperature product, and/or (iv) in the presence of precursor disposed on the fabric and/or the fabric raw materials at a stiffness-enhancing precursor concentration, and/or (v) in the presence of a stiffness-enhancing heated gas circulation rate, and/or (vi) any combination of (i), (ii), (iii), (iv), and/or (v), and/or (d) any combination of (a), (b) and/or (c).

Methods of treatment contemplated for use in the invention include ultraviolet treatment (i.e., use of high energy photons to promote polymerization of precursors), free radical treatment mechanisms (i.e., use of peroxides to promote polymerization of precursors), heat treatment and all other methods known to those of skill in the art to advance polymerization and/or derivative formation of precursors of polymeric materials.

As utilized herein, "heat treatment" means the treatment of a fabric (after weaving), which fabric comprises a plurality of fabric raw materials, and polymeric material and/or precursors of polymeric material disposed on the fabric raw materials, or the treatment of the fabric raw materials on which polymeric material and/or precursors of polymeric material are disposed (before weaving), at any temperature in the range from about 100° C. to the temperature at which the precursors and/or the polymeric material disposed on the fabric will begin to degrade (e.g., up to and exceeding 1000° F. for some precursors and/or polymeric materials). Any method known to those of skill in the art can be utilized to apply the heat to the fabric and/or fabric raw materials, including without limitation ovens, heated fabric or fabric raw material production machinery, and irons.

As utilized herein, "fabric raw materials" means a plurality of fibers and/or yarns (or tows) and/or filaments, each of which may be optionally woven and/or contacted to form a fabric.

The percentage by which (i) the ASTM stiffness value of the stiffness-treated fabric, is greater than (ii) the ASTM stiffness value of the untreated fabric is determined by taking the difference between the value in (i) and the value in (ii), dividing this difference by the value in (ii), and multiplying by 100%. With respect to both glass fiber based fabrics and carbon fiber based fabrics, this percentage is not less than 7%, and preferrably is not less than 45%. Optionally, with respect to glass fiber based fabrics, this percentage is not greater than 350%. (Table 1). Optionally, with respect to carbon fiber based fabrics, this percentage is not greater than 500%. (Table 2).

The ASTM stiffness value may vary depending on the type of fiber utilized in making the fabric and/or the conditions under which the fabric is treated. With respect to carbon fiber based fabrics, the ASTM stiffness value of a stiffness-treated fabric in accordance with the invention is not less than about 3.4 lb ft, and is generally in the range from about 3.1 lb ft to 12.0 lb ft. For example, the ASTM stiffness value is preferably within the range having as a low end point any value from about 3.1 to about 6.0 pound foot (lb ft), and as an upper end point any value greater than the low end point and from about 4.5 lb ft to about 12.0 lb ft. With respect to glass fiber based fabrics, the ASTM stiffness value generally is in the range of about 3.0 lb ft to about 8.1 lb ft. Exemplary ranges for the elevated ASTM stiffness value include a range of about 3.4 lb ft to about 7.0 lb ft, a preferred range of about 4.0 lb ft to about 6.5 lb ft, with a presently preferred range of about 4.5 lb ft to 6.0 lb ft.

Optionally, the invention fabric may have a stiffness-constraining fiber areal weight.

As utilized herein, "fiber areal weight" means the weight in grams/(meter)$^2$ (g/m$^2$) of the fabric, which fabric is finished in the case of glass-fiber based fabrics and sized in the case of carbon-fiber based fabrics. The fiber areal weight of a fabric may affect the ASTM stiffness value of such fabric, which may further depend on the style of weave utilized to make such fabric.

As utilized herein, "stiffness-constraining fiber areal weight" means a fiber areal weight preferably less than q, where q is a value selected from the range of between about 99 $g/m^2$ and 2000 $g/m^2$. For fabrics made utilizing the 8-harness style of weave, q is presently preferred to be a value selected from the range of between about 500 $g/m^2$ and 900 $g/m^2$. Fabrics with different weave styles may have different q values, as readily recognized and identified by those of skill in the art.

Further optionally present properties may enhance the desirable property of an elevated ASTM stiffness value for the invention stiffen-treated fabric when compared to untreated fabrics.

For example, a portion of the polymeric material disposed on the fibers of the invention stiffen-treated fabric may be chemically bonded to the fibers, and may optionally consist essentially of advanced n-mers of precursors of the polymeric material.

As utilized herein, "chemically bonded" means a covalent, ionic, or hydrogen bond between two chemical moieties (e.g., between two precursors, between two polymeric materials, and/or between a polymeric material and a precursor) or between a chemical moiety (e.g., a precursor or a polymeric material) and a fiber.

Conditions sufficient to permit a portion of the precursors or a portion of the polymeric material to chemically bond to the fibers during treatment include temperature, pressure and other reaction conditions (e.g., pH, presence of amines in varying concentrations, presence of electron withdrawing, presence of high energy photons, etc.,) sufficient to permit oligomer formation, glycidyl ether formation, glycidyl amine formation, ethoxylated species formation, cross-linked species formation, addition reactions (including without limitation etherification), condensation reactions, chain-extended species formation, hydrogen-bonded species formation, ionic species formation, free radical reaction species formation, and for glass fibers, oxane formation and siloxane formation, and, for carbon fibers, formation of species utilizing basic curing mechanisms (e.g., Lewis base reaction products, inorganic base reaction products, primary and/or secondary amine reaction products, and/or amide reaction products), acid curing mechanisms (e.g., Lewis acid reaction products, phenol reaction products, organic acid reaction products, anhydride reaction products), and/or olefin reaction mechanisms. See, for example, FIG. 7.

As utilized herein, "advanced n-mers of precursors (of the polymeric material)" means a polymeric material of the general formula (precursor)$_n$ minus the particular leaving groups required for the formation of the applicable derivative of the precursor, where n is the number of mers in the polymeric material and n has a value preferably not less than z, where z is a value within the range of between about 3 and about 100. Preferably the polymerization advances to completion under the treatment in the invention method.

As utilized herein, "average n-value" means the value of n, on average, determined as follows. Because of the generally low concentration of the polymeric material, the average value of n for any particular polymeric material may be determined by forming a thin film consisting essentially of a film of less than 1 mm thickness of the precursors of the polymeric material by removing substantially all of the volatiles from a thin layer of solution containing the precursors, which thin layer is disposed on an inert substrate, treating the thin film formed thereby under heat treatment, temperature and resident time conditions identical to those utilized to treat the fabric whose average n-value needs to be determined, utilizing known titration and measurement techniques to isolate the polymeric material formed thereby and to derive the average molecular weight of such polymeric material, and dividing the value of the molecular weight of the polymeric material isolated thereby by the value of the average molecular weight of the precursor thereof to get a value for n. Optionally, for carbon fiber sizings, the value of n may be determined by unwinding a predetermined length of sized carbon fiber, weighing the predetermined length, removing substantially all of the precursors and the polymeric materials of the sizing from the predetermined length by refluxing the predetermined length for an appropriate time in an appropriate solvent, removing a majority of the solvent and the remainder of the predetermined length from the refluxed solvent to form an oily residue, removing substantially all of the solvent from the oily residue under elevated temperature (e.g., 100° C.) and reduced pressure (e.g., substantially less than 14.7 PSI), and utilizing known potentiometric titration techniques to determine the value of n.

As a further example of the optionally present properties which enhance the desirable property of an elevated ASTM stiffness value for the invention fabric when compared to untreated fabrics, a portion of the polymeric material disposed on the fibers of the invention fabric may be chemically bonded to the fibers, and may coat the fibers so as to increase the average thickness thereof when compared to the corresponding fibers of an untreated fabric. Optionally, a subset of the fibers of the invention fabrics may comprise yarns (or tows) and/or filaments having both a capillary surface and a non-capillary surface, with the polymeric material disposed on the capillary surface of substantially all of the yarns (or tows) and/or filaments of the subset generally being thicker on average than the polymeric material disposed on the non-capillary surface of the same yarns (or tows) and/or filaments. The average thickness of the coating of the polymeric material on fabric raw materials may be affected by one or more of the following factors: the nature of the organofunctional groups on the polymeric material and/or the precursors thereof, the availability of water, the pH, the age of the solution of polymeric material and/or the solution of precursors thereof as of the date the applicable solution is used to coat the fabric raw materials, the topology of the surface of the fabric raw materials, and/or the presence or absence of certain catalysts.

As utilized herein, "average thickness," when used in the context of the coated fiber (or constituents thereof), can be determined by the average of a plurality of measurements of the thickness of the coated fiber (or, as applicable, constituents thereof). Measurements are taken at different points over the entire length of the fiber (or, as applicable, constituents thereof). Alternatively, "average thickness," of the coating of a capillary surface or of a non-capillary surface of the coated yarns (or tows) and/or filaments and, can be determined by plurality of measurements of the thickness of the coating on the capillary surface and the coating on the non-capillary surface of the coated yarns (or tows) and/or filaments, which measurements are taken at different points over the entire length of the same yarns (or tows) and/or filaments.

Thickness of fibers (or yarns or tows thereof) can be measured by utilizing an automated, electronic micrometer. Alternatively, thickness of fibers (or, as applicable, yarns, tows or filaments thereof) can be measured utilizing methods known to those of skill in the art. See, for example, S. Sterman, H. B. Bradley, SPI 16th Annual Technology Conference (Reinforced Plastics) (1961); G. Vogel, SPI 22nd Annual Technology Conference (Reinforced Plastics) (1967). For example, these measurements may be taken by preparing electron transmission micrograph sections from the applicable sample of yarn (or tow) and/or filament comprising a polymeric material via known methods (e.g., "Replica" method for glass fibers), and determining the measurement of the thickness of the fabric raw material, and, optionally the thickness of both the coating on the capillary surfaces and the coating on the non-capillary surfaces each for yarns (or tows) and/or filaments on the outside shell of the associated bundle. Thickness in relation to carbon fibers can be measured utilizing methods well known to those of skill in the art (e.g., scanning electron microscopy).

As utilized herein, "increase in the average thickness" means the percentage increase of (i) the thickness of the coated fiber and/or yarn (or tow) and/or filament having an increased ASTM stiffness value, when compared to (ii) the thickness of a coated fiber and/or yarn (or tow) and/or filament from a fabric not having an increased ASTM stiffness value. This percentage increase is determined by taking the difference between the value in (i) and the value in (ii) in the preceding sentence, and dividing this difference by the value in (i). This percentage increase is preferably within the range having as a low end point any value of between about 5% and about 10%, and as an upper end point any value greater than the low end point and between about 8% and about 20%. Exemplary ranges for the increased value include a range of 7% to 18%, a preferred range of 8% to 16%, with a presently preferred range of 10% to 14%.

As utilized herein, "capillary surface" means that portion of the surface of a first yarn, tow or filament, as applicable, of a fiber, which portion is defined by the set of all points on the surface of the first yarn, tow or filament, as applicable, which are intersected by a straight, radial line intersecting both the center of the first yarn, tow or filament, as applicable, and some point on a second yarn, tow or filament, as applicable, which is part of the same fiber as the first yarn, tow or filament, as applicable. As utilized herein, "non-capillary surface" means that portion of the surface of a yarn, tow or filament, as applicable, of a fiber which is not the capillary surface of such yarn, tow or filament, as applicable.

Fabrics contemplated for use in accordance with the invention are made utilizing methods well known to those of skill in the art, which methods include, without limitation and without regard to any particular order (which order is readily derivable to those of skill in the art, with the order of the steps being optionally interchangeable), one or more of the following steps: (i) making or obtaining a fiber, and/or (ii) in the case of glass fiber (and other fibers whose sizing cannot be polymerized to increase the ASTM stiffness value of the fabric made therefrom), disposing on the fiber an appropriate sizing (e.g., starch based solution for glass fibers) and/or baking off such appropriate sizing after weaving, and/or (iii) disposing on the fiber precursors of a polymeric material and/or a polymeric material, and/or (iv) treating the precursors of the polymeric material and/or the polymeric material under conditions sufficient to promote polymerization of the precursors with each other and to promote the polymeric material and/or the precursors to become chemically bonded to the fibers. The fibers so prepared can be woven under (a) any style of weave known to those of skill in the art, including without limitation those styles of weave commonly known by the designation of plain weave, crow foot weave, 5-harness satin weave, 8-harness satin weave, basket weave, 2 by 2 basket weave, leno weave, twill weave, 2/2 twill weave, 2/1 twill weave, noncrimp weave, plus minus 45 plain weave, plus minus 45 8-harness satin weave, plus minus 45 crow foot satin weave, and/or 12-harness satin weave, and/or (b) under any fiber areal weight, or otherwise joined to make the fabric.

In accordance with the invention, there are further provided methods of making a stiffness-treated fabric having an ASTM stiffness value greater than the ASTM stiffness value of an untreated fabric, which method comprises obtaining a fabric comprising a plurality of fibers and a polymeric material and/or precursors of a polymeric material disposed on the fibers, wherein a portion of the polymeric material and/or the precursors are chemically bonded to the fibers, and treating the fabric under conditions sufficient to produce a stiffness-treated fabric having an ASTM stiffness value greater than the ASTM stiffness value of a corresponding untreated fabric. Preferably, the ASTM stiffness of the stiffness-treated fabric is not less than 3.4 lb ft. Optionally, portions of the polymeric material and/or the precursors is chemically bonded to the fibers, and/or to other precursors and/or to the polymeric material wherein derivatives are formed thereby.

As examples of such conditions sufficient to produce an ASTM stiffness value of the stiffness-treated fabric greater than the ASTM stiffness value of an untreated fabric, the conditions may include without limitation heat treatment, ultraviolet treatment (e.g., use of high energy photons to promote polymerization of precursors) and free radical treatment (e.g., use of peroxides to promote polymerization of precursors).

For example, when the method of treatment is heat treatment a stiffness-enhancing temperature can be employed. As utilized herein, "stiffness-enhancing treatment temperature" means a temperature within the range having as a low end point any value of from about 250° F. to about 450° F., and as an upper end point any value greater than the low end point and from about 450° F. to about 700° F.

Exemplary ranges for the increased value include ranges of 250° F. to 600° F., and 350° F. to 500° F., with presently preferred ranges of 350° F. to 455° F. (CS724, BGF644) and 300° F. to 350° F. (BGF508A).

As a further example of such conditions sufficient to produce an ASTM stiffness value of the stiffness-treated fabric greater than the ASTM stiffness value of an untreated fabric, the fabric may be heat treated for a stiffness-enhancing resident time during weaving of the fabric. As utilized herein, "resident time" means the amount of time the fabric is subjected to heat treatment. The resident time is generally an inverse function of the line speed of the fiber and/or fabric manufacturing process line, and a function of the number of heating sources for heat treatment (e.g., ovens) along the manufacturing process line and of the length of each such heating source. For example, the resident time of a fabric made on a manufacturing process line having a line speed of 10 yards/min., with 2 ovens along the line, and a length for each oven of 10 yards, would be 2 minutes [i.e., 10 yards/oven (length of each heating source)×2 ovens (number of heating sources)×1 minute/10 yards (line speed)=2 minutes (resident time)].

As utilized herein, "stiffness-enhancing resident time" is generally a resident time within the range having as a low end point any value of between about 0.4 minutes and about 720 minutes, and as an upper end point any value greater than the low end point and between about 1.2 minutes and about 1440 minutes. Exemplary ranges for the increased value include a range of 0.4 to 10 minutes, a preferred range of 0.8 minutes to 5 minutes, with a presently preferred range of 1.2 minutes to 2.5 minutes.

As an additional example of such conditions sufficient to produce an ASTM stiffness value of the stiffness-treated fabric greater than the ASTM stiffness value of an untreated fabric, the fabric may be heat treated for a stiffness-enhancing time-temperature product. As utilized herein, "time-temperature product" means the product of the resident time and the temperature of the heat treatment. Thus, a fabric which is heat treated at 400° F. for a resident time of 2 minutes would have a time-temperature product of 800 min.-° F.

As utilized herein, "stiffness-enhancing time-temperature product" generally is a time-temperature product within the range having as a low end point any value of between about 200 min.-° F. and about 1080 min.-° F., and as an upper end point any value greater than the low end point and between about 480 min.-° F. and 1,008,000 min.-° F. Exemplary ranges for the increased value include a range of 350 min.-° F. to 6000 min.-° F., a preferred range of 440 min.-° F. to 2500 min.-° F., with a presently preferred range of 544 min.-° F. to 728 min.-° F.

As an additional example of such conditions sufficient to produce an ASTM stiffness value of the stiffness-treated fabric greater than the ASTM stiffness value of an untreated fabric, the fabric may be heat treated after weaving for a stiffness-enhancing treatment time. As utilized herein, "stiffness-enhancing treatment time" is generally a time within the range having as a low end point any value between about 2 min. and about 30 min., and as an upper end point any value greater than the low end point and between about 30 min. and about 1440 min. Exemplary ranges for carbon fiber based fabrics include a range of 2 min. to 30 min., and preferred ranges of 10 min. to 20 min. (at temperatures ranging between about 400° F. and 525° F.), and a range of 60 min. to 90 min. (at about 350° F.).

As a further example of such conditions sufficient to produce an ASTM stiffness value of the stiffness-treated fabric greater than the ASTM stiffness value of an untreated fabric, the fabric may be heat treated in the presence of precursor at a stiffness-enhancing precursor concentration.

As utilized herein, "precursor concentration" means the concentration of the precursor disposed on the fibers and/or the fabric raw materials. This concentration can vary substantially depending upon the type of precursor employed, as well as the type of weave on the fabric made from the fabric raw materials. This concentration can be measured on a weight percentage basis, which percentage can be determined by calculating the difference between (i) the weight of the fibers after such fibers are coated with such precursors, and (ii) the weight of the uncoated fibers (as determined by weighing a sample of the coated fibers after removing the coating by burning off the precursors via methods known to those of skill in the art [e.g., the "loss on ignition" or LOI method]), and dividing this difference by the value in (i). One skilled in the art may devise alternative means of calculating the precursor concentration.

As utilized herein, "stiffness enhancing precursor concentration" is any precursor concentration that is different from (e.g., greater than or less than) those concentrations in the ranges ordinarily employed and which, depending on the end-use application for which the fabric made from the unconditioned fabric will be employed, serves to enhance (or, alternatively, at lower concentrations of precursor, to not reduce) the ASTM stiffness value of the fabric. Thus, for glass fiber fabric end-use applications, where most end-use applications are more concerned with increasing stiffness than with decreasing weight, a stiffness enhancing precursor concentration would be a concentration preferably within the range having as a low end point any value of between about 0.13% and about 0.30%, and as an upper end point any value greater than the low end point and between about 0.17% and about 1.0%. Exemplary ranges for the stiffness enhancing precursor concentration on a fabric having an 8-harness satin weave with a commercially available finish available from Clark-Schwebel™ (Anderson, S.C.) include a range of 0.13% to 0.17% and a preferred range of 0.14% to 0.16%. (See Table 1, samples based on finish-type CS 724). Exemplary ranges for the stiffness enhancing precursor concentration on a fabric having an 8-harness satin weave with a commercially available finish available from Burlington Glass Fabrics™ (Alta Vista, Va.) include a range of 0.11% to 0.20%, and a preferred range of 0.13% to 0.15%. (See Table 1, samples based on finish-type BGF 508A). Alternatively, for carbon fiber fabric end-use applications, where most end-use applications are more concerned with decreasing weight, a stiffness enhancing precursor concentration would be a concentration preferably within the range having as a low end point any value of between about 0.05% and about 0.95% and as an upper end point any value greater than the low end point and between about 0.10% and about 1.58%. An exemplary range for the stiffness enhancing precursor concentration is about 0.05% to about 0.49%, with a preferred range of about 0.1% to about 0.39%. With respect to stiffness enhancing precursor concentrations that are currently commercially available, an exemplary range for the stiffness enhancing precursor concentration is about 0.8% to about 1.3%, with a preferred range of about 1.08% to about 1.17%.

As a further example of such conditions sufficient to produce an ASTM stiffness value of the stiffness-treated fabric greater than the ASTM stiffness value of an untreated fabric, the fabric may be heat treated in the presence of a stiffness-enhancing heated gas circulation rate.

As utilized herein, "heated gas circulation rate" means the rate of recirculation and/or filtration of the ambient gas (e.g., air) which is within the volume of the heating source(s) (e.g., oven(s)) utilized for heat treatment of the fabric. This rate is important because the ambient gas surrounding the fabric, when heated by the heating source for heat treatment, may act as a carrier to more efficiently add heat energy to the fabric.

Stiffness-enhancing heated gas circulation rates contemplated for use in the invention include those circulation rates which heat the fabric more efficiently (e.g., faster) than those circulation rates practiced by those of skill in the art during known processing of comparable fabrics.

In accordance with the invention, there is further provided stiffness-treated fabric having an ASTM stiffness value greater than the ASTM stiffness value of an untreated fabric made by a method comprising obtaining a fabric comprising a plurality of fibers and polymeric material and/or precursors of polymeric material disposed on at least some of the fibers, and treating the fabric under conditions sufficient to produce an ASTM stiffness value of the stiffness-treated fabric greater than the ASTM stiffness value of an untreated fabric. Optionally, (i) the stiffness-treated fabric has an ASTM stiffness value of not less than about 3.4 lb ft, and/or (ii) a portion of the polymeric material comprises advanced n-mers of the precursors, and/or (iii) the polymeric material coats a portion of the fiber so as to increase the average thickness of the coated fibers as compared to the average thickness of an equal number of corresponding fibers of an untreated fabric.

In accordance with the invention, there are further provided multiple stiffness-treated fabric raw materials for a fabric having the desirable properties of an ASTM stiffness value greater than that of an untreated fabric, for example an ASTM stiffness value of not less than 3.4 lb ft.

Examples of such invention stiffness-treated fabric raw materials include stiffness-treated fabric raw material comprising fabric raw material, precursors of polymeric material disposed on at least some of the fabric raw material in a stiffness enhancing precursor concentration, and, optionally, polymeric material disposed on at least some of the fabric raw material.

Optional types of fabric raw material and optional associated stiffness enhancing precursor concentration ranges include (i) the fabric raw material being glass fibers and/or glass yarns and/or glass filaments and the stiffness enhancing precursor concentration being in the range of 0.25% to 1.0%, and/or (ii) the fabric raw material being glass fibers and/or glass yarns and/or glass filaments, optionally woven in an 8-harness weave style to form a fabric, the precursors of polymeric material having either the formula of a commercially available finish known as CS 724 finish, and the stiffness enhancing precursor concentration being in the range of 0.13% to 0.17%, or the formula of a commercially available finish known as BGF 508A finish, and the stiffness enhancing precursor concentration being in the range of 0.11% to 0.20%, and/or (iii) the fabric raw material being carbon fibers and/or carbon tows and/or carbon filaments and the stiffness enhancing precursor concentration being in the range of 0.10% to 0.39%.

Additional optional embodiments of the fabric raw material include the following. A portion of the precursors may be chemically bonded to a subset of the at least some of the fabric raw material. Alternatively, the polymeric material may be present and disposed on at least some of the fabric raw material, and a first portion of the precursors and/or the polymeric material is chemically bonded to other precursors and/or the polymeric material, thereby forming derivatives. Further, some of the derivatives and/or the polymeric material may comprise advanced n-mers of precursors of the polymeric material, where the advanced n-mers may have an average n-value of not less than 3.

Additional examples of invention stiffness-treated fabric raw materials include a carbon fiber tow comprising a plurality of filaments and a polymeric material and/or precursors of the polymeric material disposed on a portion of the filaments and/or on the tow, wherein a portion of the polymeric material and/or the precursors is chemically bonded to the filaments, which tow has been treated with a treatment selected from the group consisting of heat treatment, ultraviolet treatment, and free radical treatment under conditions wherein an ASTM stiffness value of a stiffness-treated fabric made from the tow is greater than the ASTM stiffness value of a corresponding untreated fabric.

In accordance with the invention, there are further provided methods of making a stiffness-treated fabric raw material. One such method comprises obtaining fabric raw material, and disposing on at least some of the fabric raw material 1) precursors of polymeric material in a stiffness enhancing precursor concentration, and, 2) optionally, a polymeric material.

An additional such method comprises obtaining fabric raw material which comprises precursors of polymeric material and/or precursors of polymeric material disposed on at least some of the fabric raw material, and treating the fabric raw material with a treatment selected from the group consisting of heat treatment, ultraviolet treatment, and free radical treatment under conditions selected to yield a stiffness-treated fabric made from the stiffness-treated fabric raw material having an ASTM stiffness value of is greater than the ASTM stiffness value of an untreated fabric. Examples of fabric raw materials suitable for use in the practice of the invention are carbon fibers and/or carbon tows and/or carbon filaments.

A portion of the precursors may be chemically bonded to a subset of the at least some of the fabric raw material. Alternatively, the polymeric material may be present and disposed on the fibers, and a first portion of the precursors and/or the polymeric material may be chemically bonded to a second portion of the precursors and/or the polymeric material, thereby forming derivatives. Further, some of the derivatives and/or the polymeric material may comprise advanced n-mers of precursors of the polymeric material, wherein the advanced n-mers may have an average n-value of not less than 3.

In accordance with the invention, there are provided stiffness-treated prepreg plies comprising a stiffness-treated fabric and a resin system disposed on a portion of the stiffness-treated fabric.

As utilized herein, "prepreg ply" means a resin-impregnated fabric comprising a fabric, which fabric comprises 1) a plurality of fibers, 2) a resin system disposed on or wetting the fibers, and, 3) optionally, a polymeric material and/or precursors of the polymeric material.

Resin systems contemplated for use as part of a prepreg ply include without limitation thermosetting resins (including without limitation epoxy-based resins, polyester resins, phenolic resins, vinyl-ester resins, polysiloxane resins, cyanate ester resins, bismaleimide resins and thermosetting polyimide resins) and thermoplastic resins (including without limitation polyaralyene ether resins, polyimide resins, poly(phenylsulfide) resins, polybenzimidazole resins, polysulfone resins and liquid crystalline resins). Generally, the resin system is not fully cured until after the prepreg ply has been assembled into a desired structure (e.g., laminated structure, honeycomb sandwich structure), although partial curing (e.g., B-stage curing) prior to this time may enhance processibility of the prepreg ply.

As utilized herein, "stiffness-treated fabric" means a fabric selected from the group consisting of any of the above-identified invention stiffness-treated fabrics, fabrics made in accordance with any of the above-identified invention methods of making stiffness-treated fabrics, fabrics made from any of the above-identified invention stiffness-treated fabric raw materials, and fabrics made from any of the fabric raw materials made in accordance with any of the above-identified invention methods of making stiffness-treated fabric raw materials.

Optionally, the stiffness-treated prepreg ply, when disposed on a second prepreg ply comprising a resin system and a stiffness-treated fabric or an untreated fabric, exhibits a frictional resistance to movement between the stiffness-treated prepreg ply and the second prepreg ply or untreated fabric greater than the frictional resistance between two untreated prepreg plies disposed on one another, wherein each of the two untreated prepreg plies comprises the resin system and an untreated fabric.

The "frictional resistance (between two prepreg plies)" can be measured by any known method, but preferably by a method publicly presented and/or published in 1996 in a paper authored by M. Wilhelm, C. J. Martin and J. C. Seferis and titled "Frictional Resistance of Thermoset Prepregs and its Influence on Honeycomb Composite Processing" (hereinafter the "Boeing-Wilhelm method") the entire contents of which paper are incorporated herein by reference. This frictional resistance may be measured at any temperature up to the temperature at which the curing agent in the resin system is activated.

The frictional resistance between two prepreg plies wherein at least one prepreg ply comprises a resin system and a fabric selected from stiffness-treated fabrics may be defined in absolute or percentage increase terms. Thus, this value may be in the range having as a low point any value in the range from about 30 pounds to about 125 pounds, and as a high point any value greater than the low point, which value is in the range from about 50 pounds to about 175 pounds, as measured using the Boeing-Wilhelm method. Exemplary ranges include 50 pounds to 175 pounds, with a preferred range of 75 pounds to 175 pounds, with a presently preferred range of 125 pounds to 150 pounds, for example from about 30 pounds to about 50 pounds, as measured using the Boeing-Wilhelm method. Alternatively, this value may be any value not less than a 25% increase over the value of the frictional resistance of two prepreg plies wherein both prepreg plies comprise untreated fabric. Optionally, this percentage value may be capped at about 700%.

As utilized herein, "untreated prepreg ply" means a prepreg ply which optionally has the same type of fabric and/or resin system as the fabric and/or resin system of the stiffness-treated prepreg ply with which is it is compared. An untreated prepreg ply is a prepreg ply comprising an untreated fabric and a resin system disposed on a portion of the untreated fabric.

In accordance with the invention, there are provided methods of making a stiffness-treated prepreg ply comprising obtaining a stiffness-treated fabric and a resin system, and disposing the resin system on the stiffness-treated fabric.

Optionally, the stiffness-treated prepreg ply made in accordance with these methods, when disposed on a second prepreg ply comprising a resin system and a fabric selected from the group consisting of stiffness-treated fabrics and untreated fabrics, exhibits a frictional resistance between the stiffness-treated prepreg ply and the second prepreg ply greater than the frictional resistance between two untreated prepreg plies disposed on one another, wherein each of the two untreated prepreg plies comprises the resin system and an untreated fabric.

In accordance with the invention, there are provided stiffness-treated honeycomb sandwich structure precursors comprising a honeycomb core having a first surface, and a stiffness-treated prepreg ply disposed on the first surface, wherein the stiffness-treated prepreg ply comprises a resin system and a fabric selected from stiffness-treated fabrics. Optionally, the stiffness-treated honeycomb sandwich structure precursors (i) may further comprise at least one additional prepreg ply disposed on the first surface, wherein each of the additional prepreg ply(ies) comprises an independently selected resin system and a fabric independently selected from the group consisting of stiffness-treated fabrics and non-treated fabrics, and/or (ii) may further require that at least one prepreg ply selected from the group consisting of the additional prepreg plies and the stiffness-treated prepreg ply may extend beyond the first surface of the honeycomb core.

In accordance with the invention, there are provided stiffness-treated honeycomb sandwich structures comprising a honeycomb core having a first surface and a second surface, a first prepreg ply disposed on and extending beyond the first surface, a second prepreg ply disposed on and extending beyond the second surface, wherein a first portion of the first prepreg ply extending beyond the first surface contacts a second portion of the second prepreg ply extending beyond the second surface to form an edgeband and, optionally, additional prepreg plies disposed on the first surface and/or the second surface and/or the edgeband, wherein the first prepreg ply comprises a resin system and a fabric selected from stiffness-treated fabrics, and wherein the second prepreg ply and each of the optional additional prepreg plies each comprise an independently selected resin system and a fabric independently selected from the group consisting of stiffness-treated fabrics and untreated fabrics. Optionally, the first prepreg ply of the stiffness-treated honeycomb sandwich may have an elevated resin content.

Honeycomb sandwich structures contemplated for use in the invention include sandwich structures comprising (i) a honeycomb core having two surfaces, and (ii) at least two prepreg plies, with at least one of the prepreg plies disposed on and/or attached to each of the two surfaces of the honeycomb core. Optionally, an adhesive film may be disposed between the honeycomb core and any prepreg ply which contacts the surface of the honeycomb core and which comprises carbon fibers. More information on honeycomb sandwich structures may be derived from the paper authored by A. Marshall and titled "Market and Product Trends in the World Market for Core Materials", which paper was presented at the Honeycomb Sandwich Structure Seminar in June 1996, the entire contents of which paper are hereby incorporated herein by reference.

Honeycomb cores contemplated for use in the invention include, for example, a core which may comprise (i) about 25% to 75% (by weight) of core component selected from the group consisting of aromatic polyamide polymer fiber (aramid) (commonly known as Nomex™ paper), glass fibers, asbestos fibers, Kraft paper fibers, Kevlar™ fibers, carbon fibers, thermoplastic film, and foam (including without limitation polyurethane-based foams, polyimide-based foams and polyvinylchloride-based foams), which core component may be optionally processed to form a plurality of nodes on the core component, and (ii) optionally, about 25% to 75% (by weight) of an epoxy adhesive and/or a phenolic resin coating disposed on the core component. Alternatively, the core may comprise (i) about 30% to 90% (by weight) of core component selected from the group consisting of aluminum sheets, stainless steel sheets, titanium sheets, copper sheets, lead sheets, and inconel sheets, which core component may be processed to form a plurality of nodes on the core component, and (ii) optionally, about 10% to 70% (by weight) of an epoxy adhesive and/or a phenolic resin coating disposed on the core component. The epoxy adhesive and/or the phenolic resin coating (i) act to bind the nodes together, and/or (ii) serve as a moisture barrier, and/or (iii) serve as a fire retardant. The nodes form the walls of the honeycomb cell, which cells may have the following exemplary shapes: hexagonal cell (which may be optionally overexpanded, underexpanded, or reinforced via the optional presence of a flat bisector across the hexagon), and shaped cells known as flex core cell, double flex core cell, vari-cell, iso-core cell, and micro-cell. Additional shapes of the honeycomb core cell (e.g., polygons, circles, ellipses, irregular shapes, etc.,) may be utilized in accordance with the invention, as recognized by those of skill in the art.

As utilized herein, "elevated resin content" means a resin content of a prepreg ply comprising a fabric and a resin system, which resin content is determined as a percentage content by dividing the weight of the resin system in prepreg ply by the weight of the prepreg ply. To be considered an elevated resin content for prepreg plies comprising carbon fiber based fabrics, the resin content must generally be greater than about y%, where y is any integral value having a low end point of 42 and a high end point of 99. To be considered an elevated resin content for prepreg plies comprising glass fiber based fabrics, the resin content must generally be greater than about x%, where x is any integral value having a low end point of 40 and a high end point of 99. Increasing resin content in a prepreg ply increases the degree of core crush experienced by the honeycomb sandwich structure incorporating such prepreg ply.

Optionally, a stiffness-treated honeycomb sandwich structure in accordance with the invention may have a first core crush value less than a second core crush value of an untreated honeycomb sandwich structure.

As utilized herein, "core crush value" means the degree of core crush, as determined by: co-curing an 8 inch by 12 inch panel of a honeycomb sandwich structure; determining the area of section crushed by the following formula:

$$A = \Sigma \tfrac{2}{3} * X_n * L_n, \text{ where n varies from 1 to 4}$$

where

A is the area of the section crushed, $X_i$ is the displacement of the center of the ith honeycomb sandwich structure side from its original position, and $L_i$ is the original length of the ith honeycomb sandwich structure side; and calculating the percentage core crush according to the following formula:

$$\% \text{ Core Crush} = 100 - (96 \ in^2 - A)/96 \ in^2$$

Figure 5:
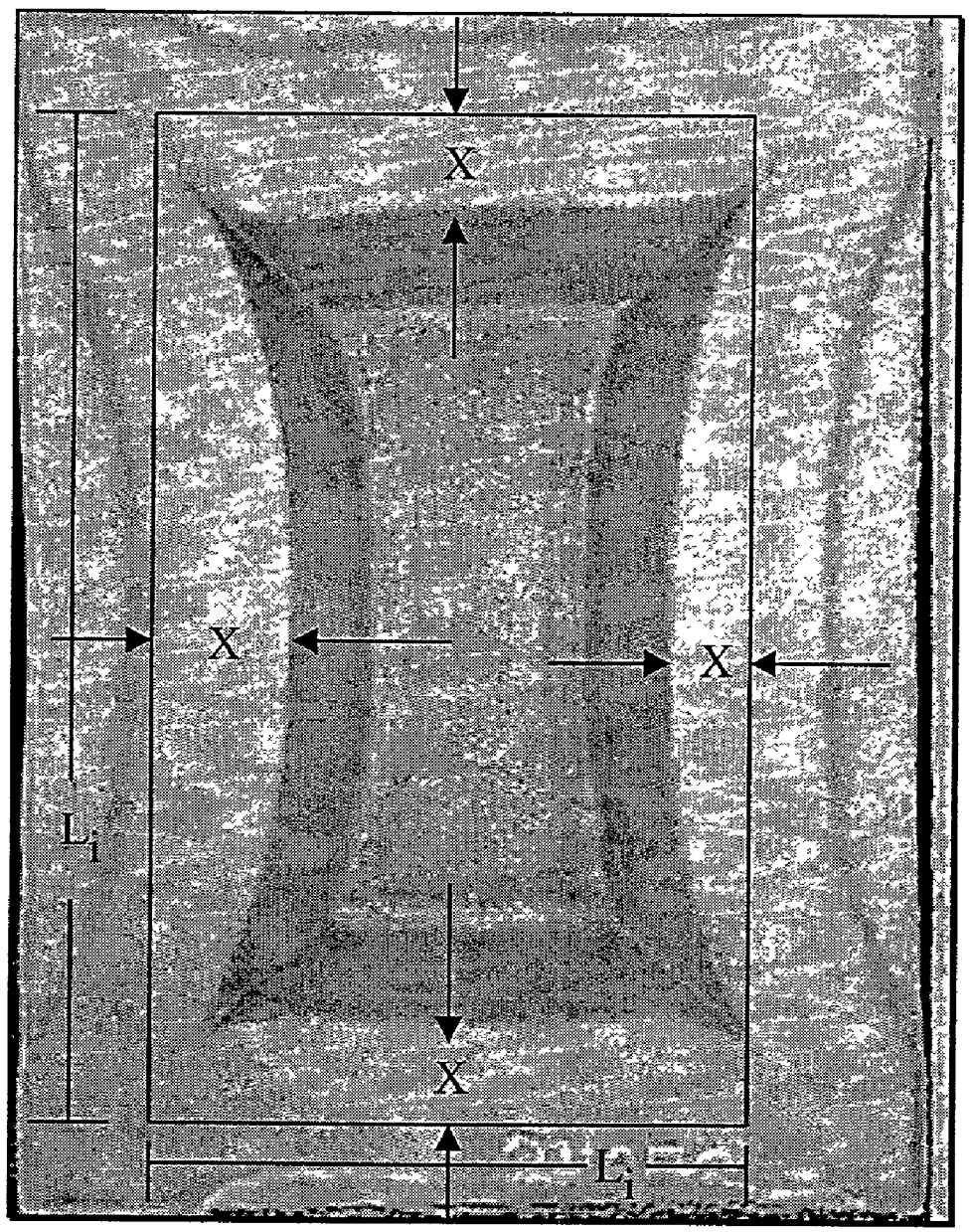
FIG. 5 illustrates a sample core crush discriminator panel exhibiting a degree of core crush after autoclaving.

See also FIG. 5.

As utilized herein, "first core crush value" means a core crush value preferably in the range having as a lower end point any value of between 0% and 0.1% and as an upper end point any value greater than the lower end point and having a value of between 0.1% and 5%. Exemplary ranges for the decreased core crush value include a range of 0% to 5%, a preferred range of 0% to 3%, with a presently preferred range of 0% to 0.1%.

As utilized herein, "untreated honeycomb sandwich structure" means a honeycomb sandwich structure which optionally has the same type of honeycomb core as the honeycomb core of the stiffness-treated honeycomb sandwich structure with which is it is compared. An untreated honeycomb sandwich structure is a honeycomb sandwich structure wherein each constituent prepreg ply thereof is an untreated prepreg ply.

Optionally, a stiffness-treated honeycomb sandwich structure in accordance with the invention may have less void content when compared to an untreated honeycomb sandwich structure.

As utilized herein, "void content" means microscopic and macroscopic voids, or delaminations, between fibers, yarns (or tows) and/or filaments, which voids or delaminations may occur between fibers, yarns (or tows) and/or filaments of different prepreg plies (known as "interply delaminations/voids") and/or between fibers, yarns (or tows) and/or filaments of the same prepreg ply (known as "intraply delaminations/voids"). Void content is measured utilizing numerous methods known to those of skill in the art, including without limitation the method commonly known and/or practiced as the "optical fiber area measurement" method. Under the "optical fiber area measurement" method, a plurality of cross sections of portions of the honeycomb sandwich structure are obtained; optionally, the cross-section having the highest visually-apparent void content is selected from the plurality by visual inspection; and the cross-section(s) are scanned by a photomicroscope, with the resultant scan being subjected to software-based analysis to determine the void content, the resin content and the fiber content of the cross-section based on an area percentage of such content over the total cross-sectional area scanned.

In accordance with the invention, there are provided methods of making a stiffness-treated honeycomb sandwich structure precursor comprising obtaining an assembled honeycomb sandwich precursor comprising a honeycomb core having a first surface, and a first prepreg ply disposed on the first surface, wherein the first prepreg ply comprises a resin system and a fabric selected from stiffness-treated fabrics, and treating the assembled honeycomb sandwich precursor under autoclave conditions sufficient to consolidate the assembled honeycomb sandwich precursor.

Honeycomb sandwich structures contemplated for use in accordance with the invention are made utilizing methods well known to those of skill in the art, which methods include, without limitation and without regard to any particular order (which order is readily identifiable by those of skill in the art) the following optional steps: preparing or obtaining a fabric, which fabric optionally is a stiffness-treated fabric, impregnating at least one sheet of fabric with a resin system to form a prepreg ply, making a honeycomb core having at least two surfaces, disposing and/or attaching one sheet to one surface of the honeycomb core to form a fabric-honeycomb core bilayer and/or to the second surface of the fabric-honeycomb core bilayer to form a fabric-honeycomb core-fabric sandwich, bagging the fabric-honeycomb core bilayer and/or the fabric-honeycomb core-fabric sandwich, removing excess air from the bag via vacuum, and/or curing the fabric-honeycomb core bilayer or co-curing the fabric-honeycomb core-fabric sandwich under increased pressure (generally not exceeding 45 PSI to prevent further core crush of the honeycomb) and, optionally increased temperature, conditions. See, for example, FIGS. 1 to 4.

In accordance with the invention, there are provided methods of making a stiffness-treated honeycomb sandwich structure comprising obtaining an assembled honeycomb sandwich comprising a honeycomb core having a first surface and a second surface, a first prepreg ply disposed on and extending beyond the first surface, a second prepreg ply disposed on and extending beyond the second surface, wherein a first portion of the first prepreg ply extending beyond the first surface contacts a second portion of the second prepreg ply extending beyond the second surface to form an edgeband. Optionally, the structures can be reinforced by additional prepreg plies disposed on the first surface and/or the second surface and/or the edgeband. The first prepreg ply comprises a resin system and a fabric selected from invention stiffness-treated fabrics, and the second prepreg ply and each of the optional additional prepreg plies each comprises an independently selected resin system and a stiffness-treated fabric or untreated fabric. The assembled honeycomb sandwich is treated under conditions sufficient to consolidate the assembled honeycomb sandwich, e.g. under autoclave conditions.

As utilized herein, "autoclave conditions" include temperature and/or pressure conditions sufficient to advance the curing of the resin system(s) disposed on the prepreg plies and/or in the honeycomb core, and/or to advance the consolidation of the assembled honeycomb sandwich.

Optionally, the stiffness-treated honeycomb sandwich structure has a first core crush value less than a second core crush value of an untreated honeycomb sandwich structure.

Further, the autoclave conditions may optionally comprise pressure sufficient to cause a first core crush value of not greater than 3% in the stiffness-treated honeycomb sandwich structure and a second core crush value of greater than 3% in an untreated honeycomb sandwich structure.

As utilized herein, a stiffness enhancing pressure is one sufficient to consolidate a "fabric—honeycomb core" bilayer into a consolidated bilayer and/or to consolidate a "fabric—honeycomb core—fabric" sandwich into a honeycomb sandwich structure. Because of the higher ASTM stiffness value of the stiffness-treated fabric compared to the untreated fabric, honeycomb core—fabric bilayers and sandwiches which utilize stiffness-treated fabrics are able to withstand higher pressures during the autoclave cycle before core crush will occur. Due to this higher pressure, greater consolidation of (and thereby lower void content in) the bilayers and sandwiches which utilize at least one stiffness-treated fabric can be achieved.

The value of the "pressure" may be stated in absolute or percentage increase terms. Thus, this value may be a pressure in the range having as a low point any value in the range of between above 45 PSI and about 60 PSI, and as a high point any value greater than the low point, which value is in the range of between about 50 PSI and about 85 PSI. Exemplary ranges include 50 PSI to 85 PSI, with a preferred range of 55 PSI to 80 PSI, with a presently preferred range of 65 PSI to 70 PSI. Alternatively, this value may be not less than a p% increase over the value of the maximum pressure utilizable to consolidate an "untreated fabric—honeycomb core—untreated fabric" sandwich into a honeycomb sandwich structure without incurring substantial core crush (e.g., about 45 PSI), where p is selected from any value between 10 and 150. Optionally, the value of p is not greater than about 200.

The invention will now be described in greater detail with reference to the following non-limiting examples. All references cited herein are hereby incorporated by reference. Those of ordinary skill in the art, when guided by the teachings of this specification, may discover during the term of this patent other embodiments of this invention which fall within the scope of the appended claims.

EXAMPLES

Figure 1:
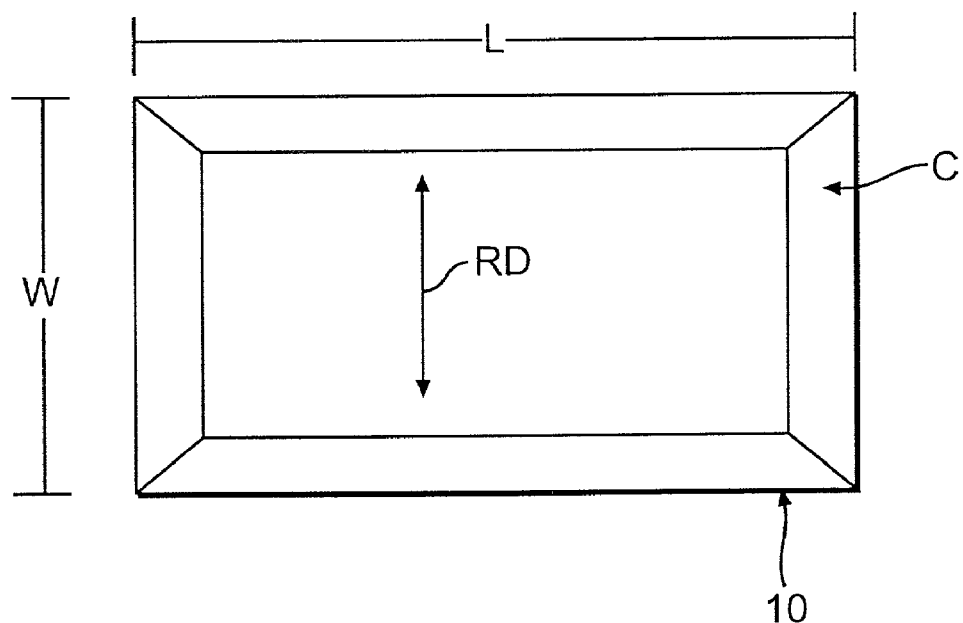
FIG. 1 illustrates a honeycomb core sample machined to form a core crush discriminator panel.

FIG. 1 illustrates a honeycomb core sample 10 machined to form a core crush discriminator panel. As shown therein, the core generally has a length "L", a width "W", a chamfer "C" disposed therearound, a ribbon direction indicated by an arrow "RD", and a cell size.

In the present examples, the honeycomb core sample 10 is a 3 lb. Nomex™ honeycomb core having a length L=12 inches, a width W=8 inches, a chamfer C=20 degrees, a ribbon direction RD running substantially in the direction of the width of the sample and substantially perpendicular to the direction of the length of the sample, and a cell size of ⅜ inch. However, those skilled in the art readily will be able to select the appropriate dimensions, topology and additional properties sufficient to achieve the desired objects and advantages of the present invention.

Figure 2A:
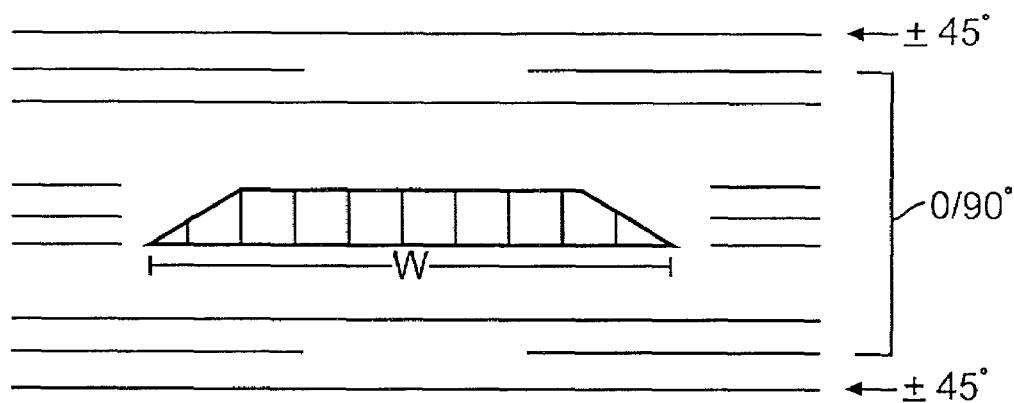
FIGS. 2A and 2B schematically illustrate a core crush panel lay-up.
Figure 2B:
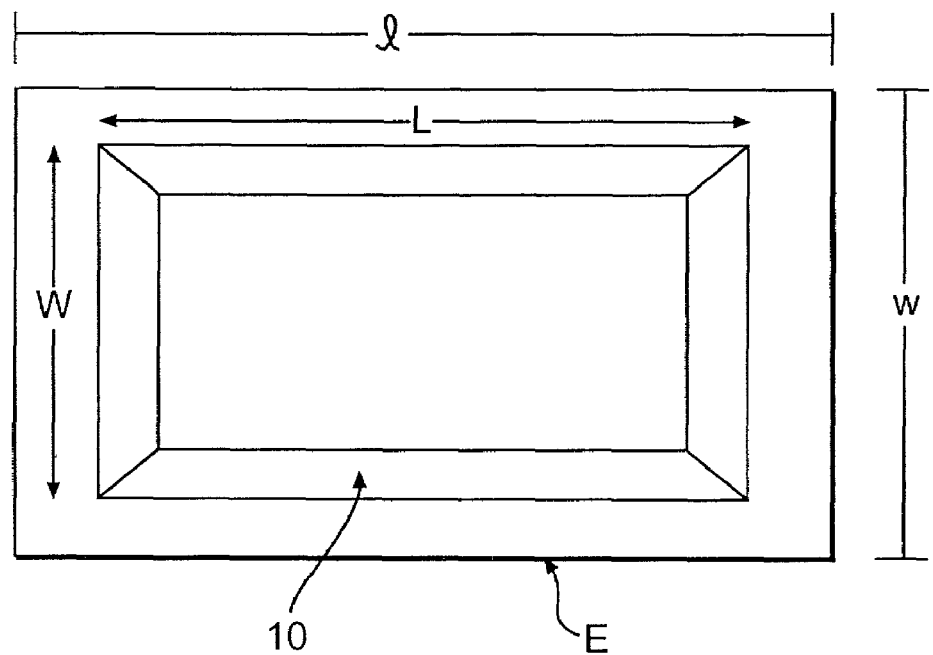

FIGS. 2A and 2B schematically illustrate a core crush panel lay-up; FIG. 2A is a cross-sectional view illustrating a general lay-up of a pre-laminate structure, and FIG. 2B is a top view of the structure.

In a present examples, the core crush panel includes a 3 lb. Nomex™ honeycomb core sample, as disclosed with reference to FIG. 1. As shown in FIG. 2A, in cross-sectional view (taken along the width W of the panel), nine distinct prepreg plies (schematically illustrated as generally horizontal lines) can be viewed.

Four of these prepreg plies are "full coverage" prepreg plies, two disposed on the top surface of the honeycomb core 10, and two disposed on the bottom surface of the honeycomb core 10, with one of each of the top and bottom plies being oriented at +/−45°, and the other of each of the top and bottom plies being oriented at −0/90°. Two of the prepreg plies are "doubler" prepreg plies, with one disposed on the top surface of the honeycomb core 10, and the other disposed on the bottom surface of the honeycomb core 10, and with the orientation of both plies being −0/90°. The three remaining prepreg plies are "picture frame" plies, with all three disposed around the edgeband E of the honeycomb sandwich structure (i.e., that part of the structure wherein the prepreg plies contact each other directly), and with the orientation of all three plies being −0/90°.

As shown in FIG. 2B, in top view the honeycomb core sandwich structure generally has a length "l", a width "w", and an edgeband E formed around the perimeter of the honeycomb core 10. In the present examples, the honeycomb core sandwich structure has a length l=16 inches and a width w=12 inches. The honeycomb core sandwich structure thus formed may be used as a core crush discriminator panel.

Figure 3:
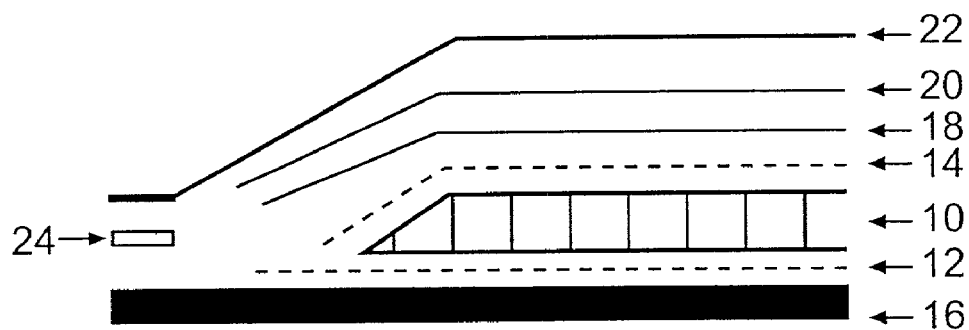
FIG. 3 schematically illustrates a bagging procedure for fabric based honeycomb sandwich structures prior to autoclaving.

FIG. 3 schematically illustrates a bagging procedure for fabric based honeycomb sandwich structures prior to autoclaving. As shown in FIG. 3, the bagging procedure generally includes a honeycomb core sample 10, at least two prepregs (e.g., fabrics treated with a resin system) 12,14 respectively disposed on the lower and upper surfaces of the honeycomb core sample to form a honeycomb core sandwich structure, a tool 16, a release film 18, a breather 20, a vacuum bag 22 and vacuum bag tape 24. The tool 16 preferably is aluminum, and the surface of the tool 16 preferably is prepared with freecote, as is known in the art. A fabric based honeycomb sandwich structure having such a lay-up may be heat treated in an autoclave to provide cocuring of the honeycomb core sample and the prepregs, as is known in the art.

Figure 4A:
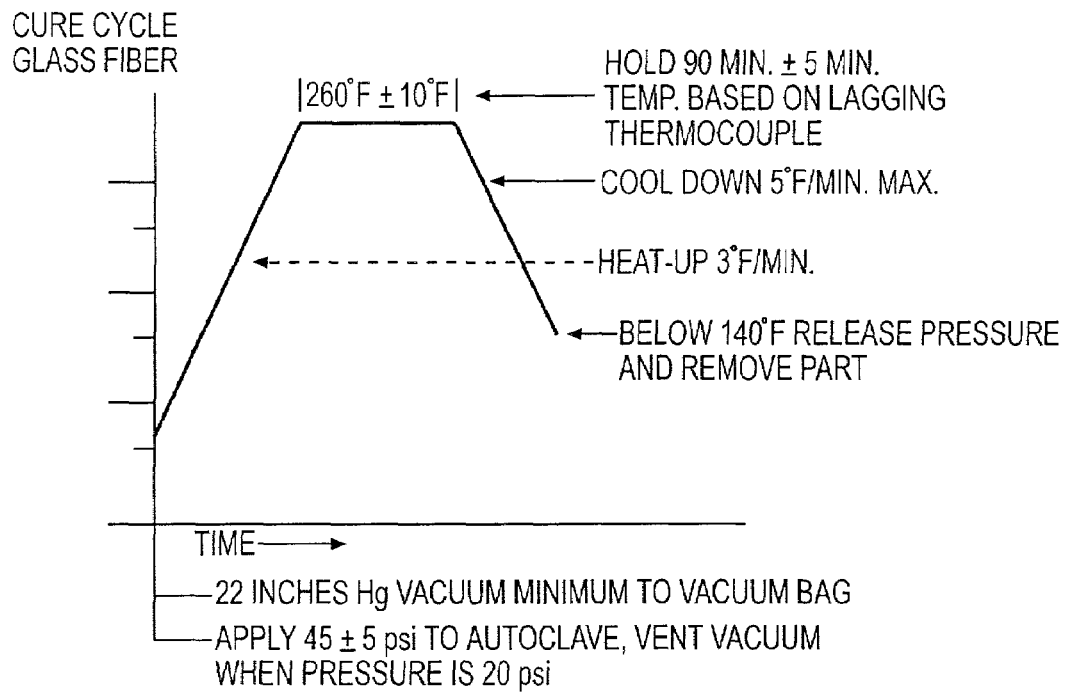
FIG. 4A is a graph illustrating an autoclave cycle for a sample glass fiber based honeycomb sandwich structure core crush discriminator panel.
Figure 4B:
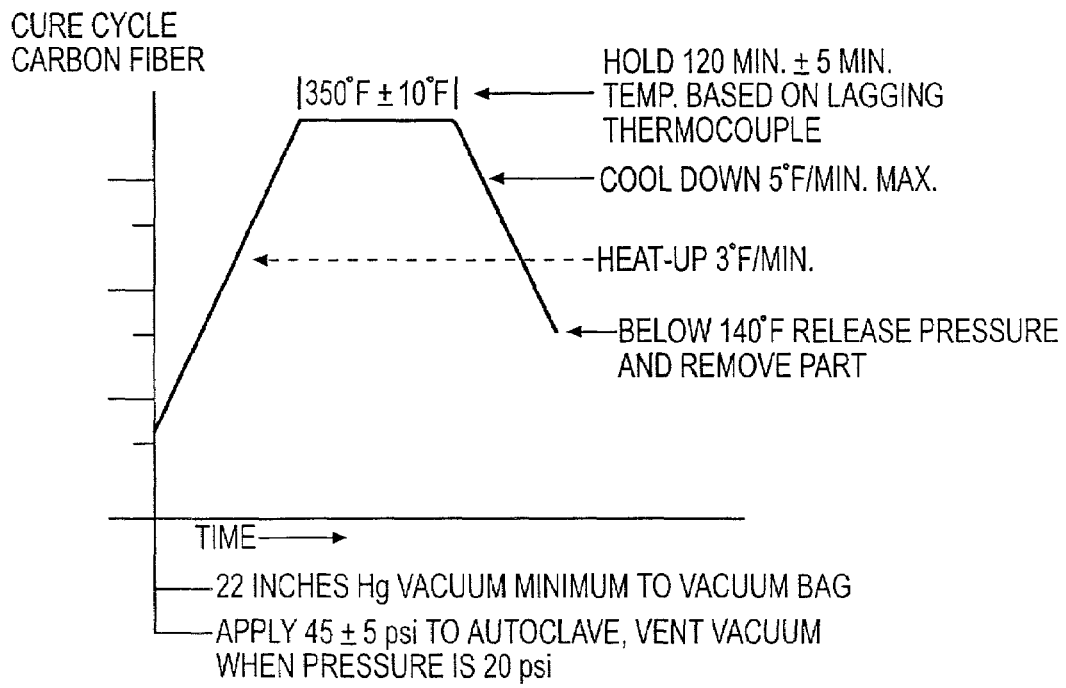
FIG. 4B is a graph illustrating an autoclave cycle for a sample carbon fiber based honeycomb sandwich structure core crush discriminator panel.

FIG. 4A is a graph illustrating an autoclave cycle for a sample glass fiber based honeycomb sandwich structure core crush discriminator panel (see Examples below), and FIG. 4B is a graph illustrating an autoclave cycle for a sample carbon fiber based honeycomb sandwich structure core crush discriminator panel (see Examples below). Referring to FIG. 4A, in the present examples with respect to glass fiber based fabrics, the following cure cycle values were used: max. heat-up rate=3° F./min., peak temperature=260° F. +/−10° F., hold time=90 min. +/−5 min., max. cool down rate 5° F./min., min. vacuum to vacuum bag=22 inches Hg, and autoclave pressure=45 PSI+/−5 PSI (vented when pressure is 20 PSI). Referring to FIG. 4B, in the present examples with respect to carbon fiber based fabrics, the following cure cycle values were used: max. heat-up rate=3° F./min., peak temperature=350° F.+/−10° F., hold time=120 min.+/−5 min., max. cool down rate 5° F./min., min. vacuum to vacuum bag=22 inches Hg, and autoclave pressure=45 PSI+/−5 PSI (vented when pressure is 20 PSI). Those skilled in the art readily will be able to determine both operable ranges and optimum values of the heat-up rates, peak temperatures, hold times, cool down rates, vacuum and autoclave pressures on the basis of the selected core and prepreg materials.

FIG. 5 illustrates a sample core crush discriminator panel exhibiting a degree of core crush after autoclaving. As shown therein, for each panel side of the autoclaved sample core crush discriminator panel each "Li" indicates the original length of a respective panel side, and "X" (located between respective pairs of opposing arrows) indicates the amount of displacement of the center of the panel side from its original location.

Example 1

Fabric and Stiffness

Glass-fiber based fabric was prepared and processed as follows. Commercially available glass fibers were sized with a starch-based solution and woven into multiple samples utilizing an 8-harness satin weave (7781 style; fiber areal weight of 293+/−10 g/m$^2$). The starch-based sizing was baked off each of the samples. Each of the samples was given an identifying designation (i.e., GL-XXX, where XXX is a value ranging from 001 to 999). See Table 1. Each of the samples was treated with one of three different commercially available finishes (e.g., precursors of the type known as CS 724, available from Clark-Schwebel™, BGF 644 or BGF 508A, both available from Burlington Glass Fabrics™) at varying precursor concentration levels. See Table 1. Each of the different samples of finished woven glass fabric was heat treated at varying temperatures for varying resident times and varying time-temperature products. See Table 1.

Carbon-fiber based fabric was prepared and processed as follows. Commercially available rolls of sized carbon-fiber based fabric, woven utilizing a plain weave (322 plain weave style; fiber areal weight of 193+/−7 g/m$^2$), were procured. Each of the rolls of fabric was treated with one of two different commercially available sizings [e.g., precursors of the type known as UC309, available from Union Carbide (Danbury, Conn.) and processed by Amoco (Greenville, S.C.) or Toray (Japan) (Toray's precursor may have a different commercial identification although Toray's precursor has the same chemical structure as UC309), or of the type known as EP03, available from Toho (Japan) and processed by Toho (Palo Alto, Calif.)] at varying precursor concentration levels. See Table 2. Each of the rolls was given an identifying designation (i.e., GR-XXX, where XXX is a value ranging from 001 to 999). Each of the first four rolls then further was divided into two samples, a "control" sample (i.e., a sample in Table 2 having an identifying designation but not labeled with a suffix of "a") and a "treated" sample (i.e., the sample in Table 2 having the same identifying designation as the "control" sample, and also labeled with a suffix of "a"). See Table 2. Each of the "control" samples was an untreated fabric. Each of the "treated" samples is an untreated fabric that was subjected to heat treatment at a treatment temperature (° F.) for a treatment time (minutes). Each of the remaining rolls/samples is an untreated fabric that was subjected to heat treatment at a treatment temperature (° F.) for a treatment time (minutes), as indicated. See Table 2 (NA means Not Applicable).

Referring to the data set forth in Table 2, those skilled in the art readily will appreciate that enhanced ASTM values

TABLE 1

| Sample ID | Finish Type | ASTM Stiffness Value (lb ft) | % Core Crush | % Finish (LOI) | Treatment Temp (° F.) | Line Speed (yrds/min) | Resident Time (min) |
|---|---|---|---|---|---|---|---|
| 222 | | | | | | | |
| GL-010 | CS724 | 5.9 | 0 | 0.17 | 450 | 25 | 1.2 |
| GL-011 | CS724 | 4.5 | 0 | 0.14 | 450 | 25 | 1.2 |
| GL-012 | CS724 | 2.8 | 20 | 0.10 | 350 | 40 | 0.8 |
| GL-014 | CS724 | 2.2 | 35 | 0.10 | 350 | 40 | 0.8 |
| GL-015 | BGF644 | 6.3 | 0 | 0.16 | 500 | 20 | 1.6 |
| GL-019 | BGF644 | 6.0 | 0 | 0.16 | 525 | 20 | 1.6 |
| GL-030 | BGF644 | 3.4 | 5 | 0.16 | 375 | 30 | 1.1 |
| GL-031 | BGF644 | 4.6 | 0 | 0.16 | 450 | 40 | 0.8 |
| GL-041 | CS724 | 8.0 | 0 | 0.17 | 450 | 25 | 1.2 |
| GL-042 | CS724 | 5.9 | 0 | 0.14 | 450 | 25 | 1.2 |
| GL-042a | CS724 | 6.6 | 0 | 0.14 | 450 (1.2) 350 (1440) | 25 (1.2) 0 (1440) | 1.2 +1440 |
| GL-047 | BGF644 | 4.0 | 3 | 0.17 | 425 | 20 | 1.6 |
| GL-048 | BGF644 | 3.0 | 15 | 0.17 | 350 | 20 | 1.6 |
| GL-051 | CS724 | 2.4 | 23 | 0.10 | 350 | 40 | 0.8 |
| GL-052 | CS724 | 2.5 | 21 | 0.10 | 350 | 40 | 0.8 |
| GL-053 | CS724 | 2.7 | 18 | 0.10 | 350 | 40 | 0.8 |
| GL-054 | CS724 | 1.9 | 25 | 0.10 | 350 | 40 | 0.8 |
| GL-055 | CS724 | 8.1 | 0 | 0.16 | 600 | 20 | 1.6 |
| GL-242 | BGF508A | 5 | 0 | 0.12 | 350 | 20 | 1.6 |
| GL-243 | BGF508A | 5.3 | 0 | 0.15 | 350 | 20 | 1.6 |
| GL-245 | BGF508A | 5.9 | 0 | 0.13 | 350 | 20 | 1.6 |
| GL-279 | BGF508A | 2.7 | 26 | 0.09 | 350 | 20 | 1.6 |
| GL-280 | BGF508A | 5.9 | 0 | 0.13 | 350 | 20 | 1.6 |
| GL-281 | BGF508A | 5.7 | 0 | 0.13 | 350 | 20 | 1.6 |
| GL-283 | BGF508A | 4.1 | 17 | 0.12 | 350 | 20 | 1.6 |
| GL-285 | BGF508A | 5.7 | 0 | 0.14 | 350 | 20 | 1.6 |
| GL-234 | BGF508A | 6.1 | tbd | 0.18 | 250 | 20 | 1.6 |
| GL-233 | BGF508A | 6.4 | tbd | 0.24 | 300 | 20 | 1.6 |
| GL-235 | BGF508A | 5.7 | tbd | 0.15 | 325 | 20 | 1.6 |
| GL-229 | BGF508A | 5.8 | tbd | 0.14 | 375 | 20 | 1.6 | and reduced core crush values may be achieved by the present invention either by treating the carbon fibers prior to weaving or by treating a carbon fiber based fabric post weaving.

Those skilled in the art also will appreciate that the temperature range for heat treating a carbon fiber or carbon fiber based fabric has an upper limit that is sizing specific. The upper limit may be a temperature at which the sizing begins to degrade during heat treatment, such that, regardless of the % finish (LOI), the treated carbon fiber or carbon fiber based fabric may not exhibit an enhanced ASTM value or core crush value. Heat treatment above this limit may be evidenced by a characteristic burning odor during heat treatment.

TABLE 2

| Sample ID | Sizing Type | ASTM Stiffness Value (lb ft) | % Core Crush | % Sizing | Treatment Temp (° F.) | Treatment Time (min.) |
|---|---|---|---|---|---|---|
| GR-001 | UC309 | 2.2 | 16 | 1.2 | NA | +0 |
| GR-001a | UC309 | 3.1 | 0 | 1.2 | 350 F. | 1440 |
| GR-002 | EP03 | 2.4 | 37 | 1.4 | NA | +0 |
| GR-002a | EP03 | 12.0 | 0 | 1.4 | 350 F. | 1440 |
| GR-003 | UC309 | 2.1 | 7 | 1.1 | NA | +0 |
| GR-003a | UC309 | 3.7 | 0 | 1.1 | 350 F. | 1440 |
| GR-004 | UC309 | 3.3 | 43 | 1.1 | NA | +0 |
| GR-004a | UC309 | 6.4 | 0 | 1.1 | 350 F. | 1440 |
| GR-005 | UC309 | 3.5 | 25 | 1.1 | NA | +0 |
| GR-006 | UC309 | 4.8 | 8 | 1.1 | 350 F. | 30 |
| GR-007 | UC309 | 5.2 | | 1.1 | 350 F. | 60 |
| GR-008 | UC309 | 5.6 | | 1.1 | 350 F. | 90 |
| GR-009 | UC309 | 5.4 | | 1.1 | 350 F. | 120 |
| GR-010 | UC309 | 5.6 | | 1.1 | 350 F. | 180 |
| GR-011 | UC309 | 5.6 | | 1.1 | 350 F. | 240 |
| GR-012 | UC309 | 6.1 | 0 | 1.1 | 350 F. | 360 |
| GR-014 | UC309 | 5.4 | 0 | 1.1 | 500 F. | 10 |
| GR-015 | UC309 | 5.2 | | 1.1 | 500 F. | 20 |
| GR-016 | UC309 | 4.3 | | 1.1 | 600 F. | 10 |
| GR-017 | UC309 | 4.1 | | 1.1 | 600 F. | 20 |
| GR-018 | UC309 | 4.0 | | 1.1 | 500 F. | 2 |
| GR-019 | UC309 | 4.3 | 5 | 1.1 | 500 F. | 4 |
| GR-020 | UC309 | 4.5 | | 1.1 | 500 F. | 6 |
| GR-021 | UC309 | 4.9 | | 1.1 | 500 F. | 8 |
| GR-022 | UC309 | 5.4 | | 1.1 | 500 F. | 15 |
| GR-023 | UC309 | 5.3 | | 1.1 | 500 F. | 30 |
| GR-024 | UC309 | 3.1 | | 1.1 | | |
| GR-025 | UC309 | 2.4 | | 1.1 | | |
| GR-026 | UC309 | 3.4 | 30 | 1.1 | NA | +0 |
| GR-027 | UC309 | 4.8 | | 1.1 | 525 F. | 2 |
| GR-028 | UC309 | 5.0 | | 1.1 | 525 F. | 4 |
| GR-029 | UC309 | 4.9 | | 1.1 | 525 F. | 6 |
| GR-030 | UC309 | 4.7 | | 1.1 | 525 F. | 8 |
| GR-031 | UC309 | 5.0 | 0 | 1.1 | 525 F. | 10 |
| GR-032 | UC309 | 5.2 | | 1.1 | 350 F. | 1440 |
| GR-033 | UC309 | 4.7 | | 1.1 | 350 F. | 360 |
| GR-034 | UC309 | 4.5 | | 1.1 | 450 F. | 10 |
| GR-035 | UC309 | 4.0 | | 1.1 | 500 F. | 10 |

The ASTM stiffness value of, or stiffness of, each sample of the glass-fiber fabric and the carbon-fiber fabric was determined by the circular bend procedure developed by the American Society for Testing and Materials (ASTM). The ASTM stiffness values derived by such testing are summarized at Table 1 and Table 2. As seen from Table 1 and Table 2, the numerous fabrics with increased ASTM stiffness values define a genus of fabrics having an increased ASTM stiffness value, as contemplated by the invention.

Example 2

Starting Materials

Glass-fiber based starting materials were prepared and processed as follows. Commercially available glass fibers were sized with a starch-based solution and woven into multiple samples utilizing an 8-harness satin weave (7781 style; fiber areal weight of 293+/−10 g/m$^2$). The starch-based sizing was baked off each of the samples. Each of the samples was given an identifying designation (i.e., GL-XXX, where XXX is a value ranging from 001 to 999). See Table 1. Samples identified as GL-010 (0.17%), GL-011 (0.14%), GL-041 (0.17%), GL-042 (0.14%) and GL-055 (0.16%), together with GL-015 (0.16%), GL-019 (0.16%), GL-030 (0.16%), GL-031 (0.16%), GL-047 (0.17%), and GL-048 (0.17%) were given stiffness enhancing precursor concentration levels (0.14%-0.17%, as indicated in parentheses) of the particular finish, when compared to the commercially practiced finish concentrations for the particular finish (e.g., CS 724 or BGF 644, as applicable), estimated to be 0.10%+/−0.02%. Similarly, samples identified as GL-243 (0.15%), GL-245 (0.13%), GL-229 (0.14%), GL-280 (0.13%), GL-281 (0.13%) and GL-285 (0.14%) were given stiffness enhancing precursor concentration levels (0.13%-0.15%, as indicated in parentheses) of the particular finish, when compared to the commercially practiced finish concentrations for the particular finish (e.g., BGF 508A, as applicable), estimated to be 0.10%+/−0.02%.

As seen in Table 1, from ASTM stiffness testing performed on the heat treated fabric formed from such starting materials, stiffness values for sample glass fiber based fabrics ranged from 3.0 to 8.1, which are within the defined increased ASTM stiffness value ranges contemplated by the invention.

Example 3

Honeycomb Sandwich Structure and Precursors Thereof

Honeycomb core conforming to Boeing Material Specifications 8-124, Class IV, type V, grade 3 was procured from a commercially available source (Hexcel Corporation, Casa Grande, Ariz.). The honeycomb core was machined to the dimensions shown in FIG. 1, and a rectangular panel of a honeycomb sandwich structure was assembled as shown in FIGS. 2A and 2B, bagged as shown in FIG. 3, and cured as shown in FIGS. 4A and 4B, for each of the selected sample fabrics, as follows.

Referring to FIGS. 1, 2A and 2B, the honeycomb sandwich structure comprised (i) a Nomex™ honeycomb core, (ii) four prepreg plies, two disposed on and extending beyond the top surface of the honeycomb core and two disposed on and extending beyond the bottom surface of the honeycomb core, with a portion of the surface of the plies which extended beyond the surfaces contacting each other to form an edgeband, (iii) three additional "picture-frame" prepreg plies disposed solely along the edgeband, and (iv) two additional "doubler" prepreg plies, both disposed solely on the side edges (e.g., slanted side surface connecting top surface to bottom surface) of the honeycomb core and the edgeband, all of which prepreg plies comprised a respective one of the selected sample fabrics prepared in accordance with Example 1.

For each of the selected sample fabrics prepared in accordance with Example 1, a prepreg sheet was prepared by wetting the sample fabric with an appropriate resin system. The prepreg sheet was cut into two pieces, or prepreg plies, and disposed on the honeycomb core to form a honeycomb panel precursor. Each of the prepreg plies was of sufficient dimension to permit both (i) covering of all surfaces of the honeycomb core and (ii) overlap of the two prepreg plies to form an edgeband, all in accordance with the dimensions of the rectangular, core crush discriminator honeycomb sandwich structure panel, the lay-up of which is illustrated in FIG. 2A.

The honeycomb panel precursor was laid up on an aluminum tool and bagged in accordance with FIG. 3.

The bagged honeycomb panel precursor was subjected to an autoclave cycle, which autoclave cycle was run in accordance with either FIG. 4A (glass fiber based fabric) or FIG. 4B (carbon fiber based fabric).

After the autoclave cycle, the honeycomb sandwich structure panel was formed and ready for core crush value measurement.

Example 4

Measuring Core Crush

Rectangular panels of a honeycomb sandwich structure comprising a Nomex™ honeycomb core and two prepreg plies comprising the same fabric were assembled and cured for each of the selected sample fabrics in accordance with Example 3.

Referring to FIG. 5, for each of the honeycomb sandwich structure panels prepared thereby, the following measurements were taken for each of the 4 sides of such panel:
the displacement of the center of the panel side from its original position (X), and
the original length of the panel side ($L_i$).

Once measurements were taken for all four sides, the area of the section of the panel which was crushed was calculated as follows:

$$A = \Sigma \tfrac{2}{3} \ast X_n \ast L_n, \text{ where n varies from 1 to 4}$$

where
A is the area of the section of the panel which was crushed,
$X_i$ is the displacement of the center of the ith honeycomb sandwich structure side from its original position, and
$L_i$ is the original length of the ith honeycomb sandwich structure side; and Once the value of A was determined, the percentage core crush was calculated according to the following formula:

$$\% \text{ Core Crush} = 100 - (96 \, in^2 - A)/96 \, in^2$$

The results of the core crush percentage for each of the honeycomb cores assembled utilizing the same sample fabrics are set forth at Table 1.

Example 5

Measuring Frictional Resistance Between Prepreg Plies

Frictional resistance between prepreg plies assembled from species of the invention was measured as follows.

The following three sample glass-fiber based fabrics prepared in accordance with Example 1 were utilized in the frictional resistance measurement test:
Sample 1, which was a "control" or untreated fabric woven in an 8-harness satin weave having a fiber areal weight of 293+/−10 g/m² having a finish (commercially available from Clark Schwebel™ as CS 724) concentration of 0.10% and heat treated at 300-350° F. for 1.4+/−0.2 minutes;
Sample 2, which was a "stiffness-treated" fabric woven in an 8-harness satin weave having a fiber areal weight of 293+/−10 g/m², having a finish (commercially available from Clark Schwebel™ as CS 724) concentration of 0.16% and heat treated at 450° F. for 1.4+/−0.2 minutes;
Sample 3, which was a "stiffness-treated" fabric woven in an 8-harness satin weave having a fiber areal weight of 293+/−10 g/m², having a finish (commercially available from Burlington Glass Fabrics™ as BGF 644) concentration of 0.17% and heat treated at 500° F. for 1.2 minutes.

For each of the three sample glass-fiber based fabrics, a prepreg sheet was prepared by wetting the sample fabric with an appropriate resin system (e.g., thermosetting epoxy based resin system commercially available from Cytec Fiberite (Tempe, Ariz.), known as Cytec Fiberite 7701). The prepreg sheet was cut into two rectangular, about equal-sized pieces, or prepreg plies. Each piece of the two piece set was disposed on the other piece to form a bilayer, with a portion of each piece overlapping over the other piece on opposite ends of the bilayer.

The frictional resistance between the pieces of the bilayer was measured in accordance with the method of measuring frictional resistance between two prepreg plies, which method was publicly presented and/or published in 1996 in a paper authored by M. Wilhelm, C. J. Martin and J. C. Seferis and titled "Frictional Resistance of Thermoset Prepregs and its Influence on Honeycomb Composite Processing," the entire contents of which paper are incorporated herein by reference. See FIGS. 10-12.

To summarize the method, the bilayer was inserted into a frictional resistance testing machine comprising two clamps, whose jaws faced each other, and means of adjusting and measuring a pulling force between the clamps. One of the two overlapping edges of the bilayer was placed in each clamp, and the jaws of the clamp were secured against the overlapping edge to prevent slippage of the overlapping edge within the jaws of the clamp. A force was then applied between the clamps, and slowly increased until substantial slippage between the two layers of the bilayer was observed. The force at which substantial slippage was observed (e.g., the LOAD) was identified as the frictional resistance between the prepreg plies.

Frictional resistance testing was performed on each of the three samples at each of two platen temperatures: 125° F. and 175° F. The results of the frictional testing are set forth in Table 3, below.

TABLE 3

| SAMPLE NUMBER | LOAD (LBS) | TEMPERATURE (° F.) (Platens) |
|---|---|---|
| 1 | 30.45 | 175 |
| 2 | 156.0 | 175 |
| 3 | 151.9 | 175 |
| 1 | 19.38 | 125 |
| 2 | 134.3 | 125 |
| 3 | 127.5 | 125 |

Figure 10:
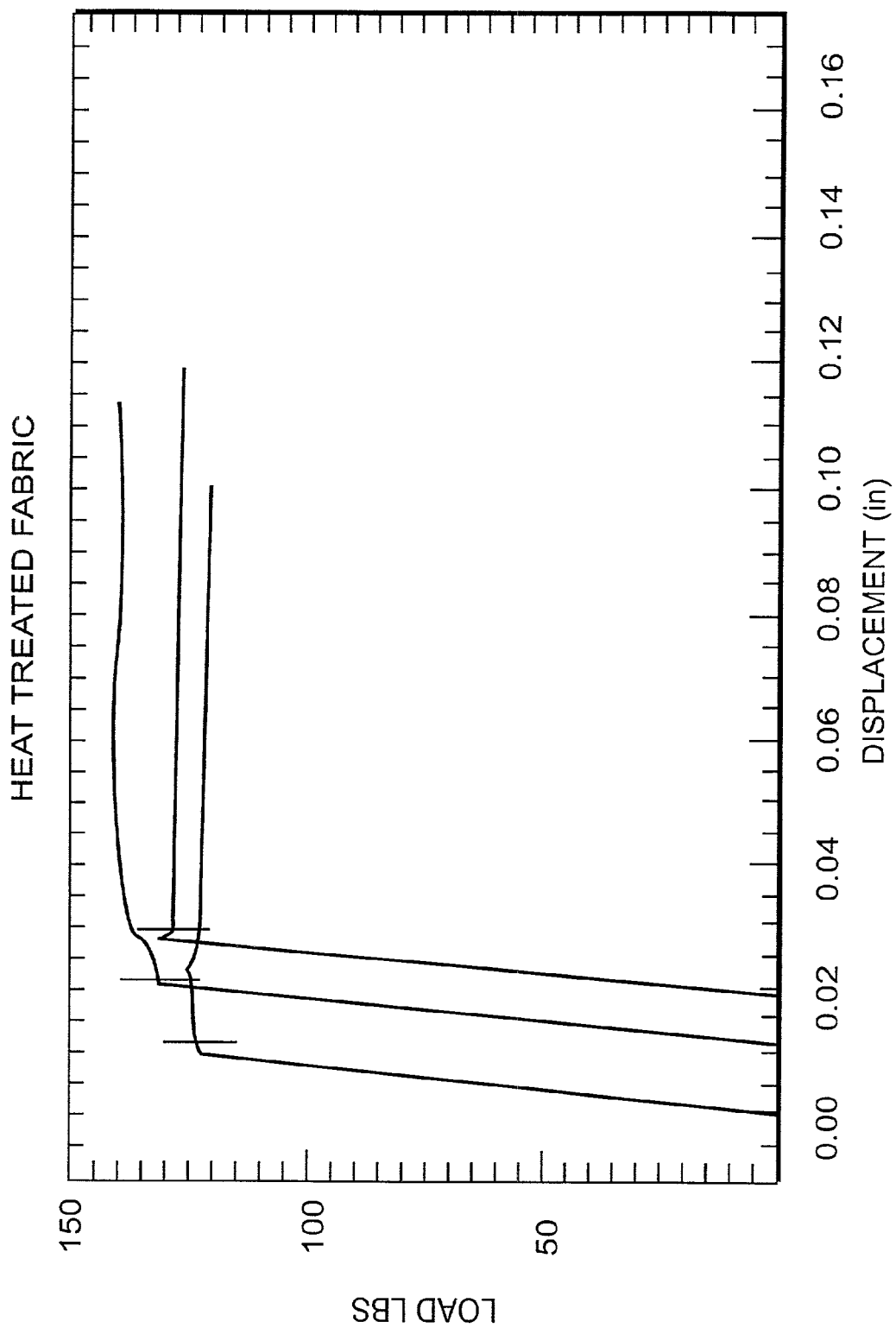
FIG. 10 is a graph illlustrating the frictional force displayed between two prepreg plies based on two heat-treated fabrics (i.e., Sample 3) of Example 5 at 125° F.
Figure 11:
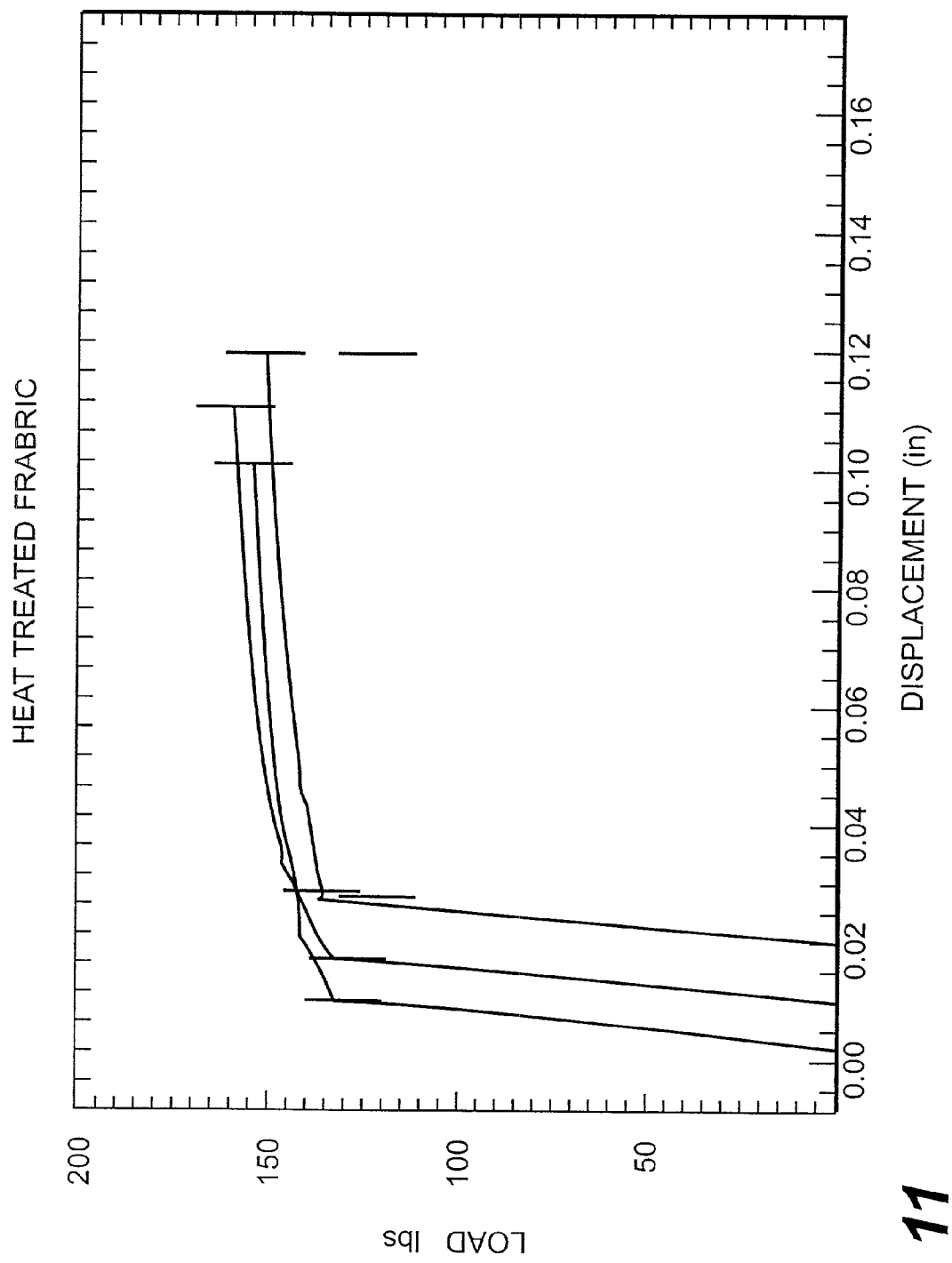
FIG. 11 is a graph illustrating the frictional force displayed between two prepreg plies based on two heat-treated fabrics (i.e., Sample 2) of Example 5 at 175° F.
Figure 12:
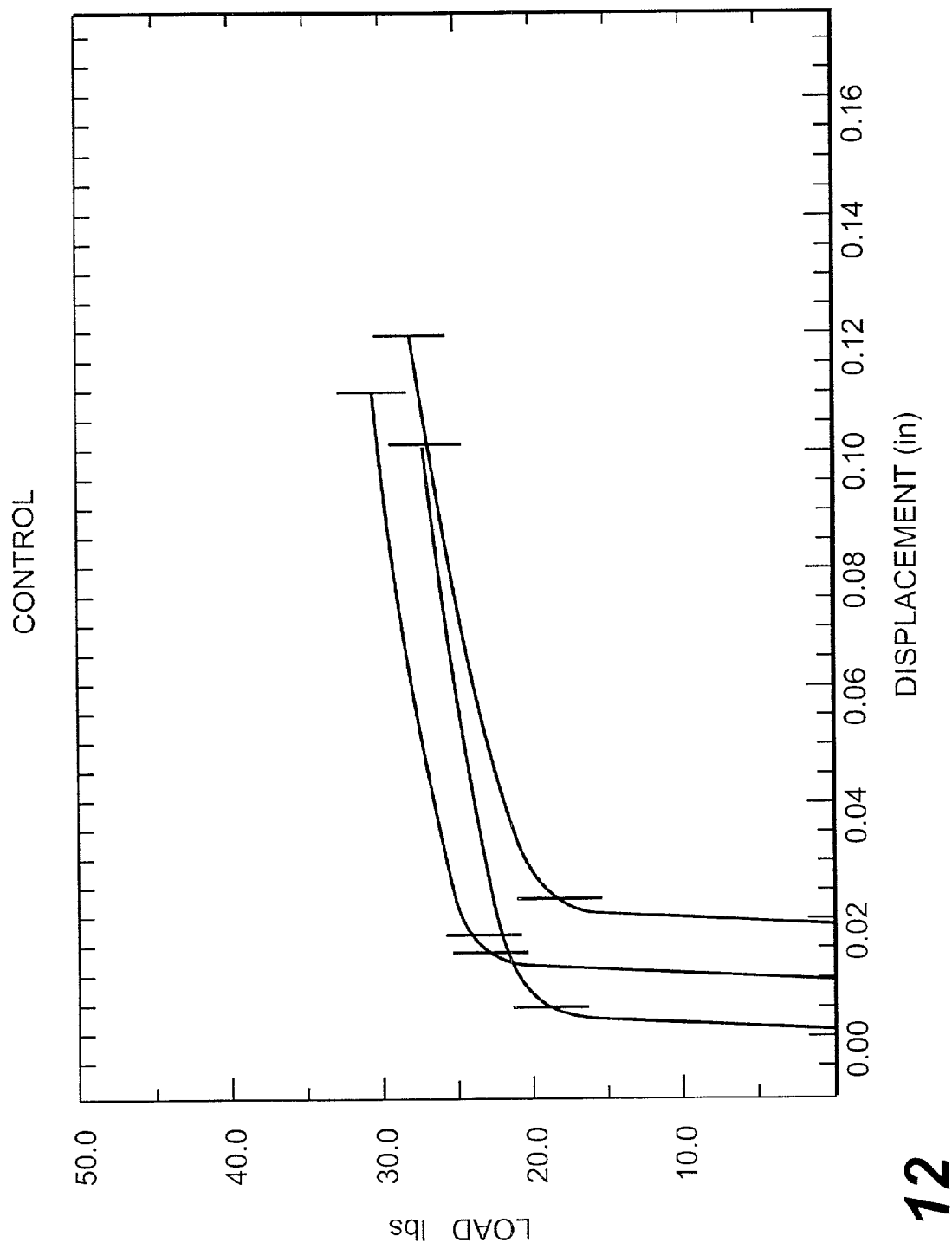
FIG. 12 is a graph illustrating the frictional force displayed between two prepreg plies based on two untreated fabrics (i.e., Sample 1) of Example 5 at 125° F.

FIGS. 10 to 12 are graphs illustrating load v. displacement values for Samples 2, 3 and 1 at platen temperatures of 125° F., 175° F. and 125° F., respectively, as follows.

FIG. 10 is a graph illustrating the frictional force displayed between two prepreg plies based on two heat-treated fabrics (i.e., Sample 3) of Example 5 at a platen temperature of 125° F. Each curve in the graph represents the interply displacement (inches) of these two prepreg plies relative to each other as a function of the force (e.g., load, measured in pounds) exerted against the prepreg plies. The point at which the vertical hash mark intersects each curve is the frictional resistance for that sample plot. The x-intercept of each curve represents the zero point for displacement. This curve may explain how stiffness-treated fabric in a prepreg ply can mitigate core crush.

FIG. 11 is a graph illustrating the frictional force displayed between two prepreg plies based on two heat-treated fabrics (i.e., Sample 2) of Example 5 at 175° F. Each curve in the graph represents the interply displacement (inches) of these two prepreg plies relative to each other as a function of the force (e.g., load, measured in pounds) exerted against the prepreg plies. The point at which the vertical hash mark intersects each curve is the frictional resistance for that sample plot. The x-intercept of each curve represents the zero point for displacement. This curve may explain how stiffness-treated fabric in a prepreg ply can mitigate core crush.

FIG. 12 is a graph illustrating the frictional force displayed between two prepreg plies based on two untreated fabrics (i.e., Sample 1) of Example 5 at 125° F. Each curve in the graph represents the interply displacement (inches) of these two prepreg plies relative to each other as a function of the force (e.g., load, measured in pounds) exerted against the prepreg plies. The point at which the vertical hash mark intersects each curve is the frictional resistance for that sample plot. The x-intercept of each curve represents the zero point for displacement.

What is claimed is:

1. A prepreg of a honeycomb sandwich structure precursor comprising:
    a honeycomb core;
    a stiffness-treated prepreg ply comprising:
        (a) a stiffness-treated fabric, consisting of a plurality of fibers and a polymerized precursor of a polymeric material disposed on the fibers, polymerized with a treatment selected from the group consisting of heat treatment, ultraviolet treatment, and free radical treatment, to polymerize the precursor of a polymeric material, where the stiffness-treated fabric exhibits an ASTM stiffness value not less than 7% greater than the ASTM stiffness value of an untreated fabric; and
        (b) a curable resin system applied to the stiffness-treated fabric prior to contacting with the honeycomb core; and
    a second prepreg ply selected from the group consisting of a stiffness-treated prepreg ply and an untreated prepreg ply, where the untreated prepreg ply comprises a curable resin system and an untreated fabric, interposed between the honeycomb core and the stiffness-treated prepreg ply;
    where the stiffness-treated prepreg ply exhibits a frictional resistance to the second prepreg ply greater than the frictional resistance between two untreated prepreg plies disposed against one another, so as to enhance resistance to core crush when autoclave pressures are raised to decrease void content of a honeycomb core during fabrication of a honeycomb core structure from the honeycomb core structure precursor.

2. A prepreg of a honeycomb sandwich structure precursor consisting of a honeycomb core, and a plurality of uncured stiffness-treated prepreg plies, at least one of which is in contacting relation to the honeycomb core, and where the plurality of uncured stiffness-treated prepreg plies are disposed adjacent one another, said uncured stiffness-treated prepreg plies comprising:
    a stiffness-treated fabric, comprising a plurality of fibers and a polymerized precursor of a polymeric material where the precursor of a polymeric material is disposed on the fibers, and polymerized with a treatment selected from the group consisting of heat treatment, ultraviolet treatment, and free radical treatment, to polymerize the precursor of a polymeric material, where the resulting stiffness-treated fabric exhibits an ASTM stiffness value not less than 7% greater than the ASTM stiffness value of an untreated fabric; and
    a curable resin system applied directly to the stiffness-treated fabric to form an uncured stiffness-treated prepreg ply prior to contacting with the honeycomb core,
    where an uncured stiffness-treated prepreg ply, when disposed on a second uncured prepreg ply comprising a resin system and a fabric selected from the group consisting of the stiffness-treated fabric and untreated fabrics, exhibits a frictional resistance between the stiffness-treated prepreg ply and the second prepreg ply sufficiently greater than the frictional resistance between two untreated prepreg plies disposed on one another, where each of the two untreated prepreg plies comprises the resin system and an untreated fabric, so as to enhance resistance to core crush when autoclave pressures are raised to decrease void content of a honeycomb core during fabrication of a honeycomb core structure from the honeycomb core structure precursor.

3. The prepreg according to claim 2, wherein the frictional resistance between the stiffness-treated prepreg ply and the second prepreg ply is between 50 pounds and 175 pounds as measured by the Boeing-Willhelm method.

4. The prepreg according to claim 2, wherein the frictional resistance between the stiffness-treated prepreg ply and the second prepreg ply is between 75 pounds and 175 pounds as measured by the Boeing-Willhelm method.

5. The prepreg according to claim 2, wherein the frictional resistance between the stiffness-treated prepreg ply and the second prepreg ply is between 100 pounds and 150 pounds as measured by the Boeing-Willhelm method.

* * * * *